United States Patent
Uehara

[19]
[11] Patent Number: 5,921,416
[45] Date of Patent: Jul. 13, 1999

[54] DOUBLE-WALL BOTTLE AND METHOD AND APPARATUS FOR MOLDING THE SAME

[75] Inventor: Shinichi Uehara, Ueda, Japan

[73] Assignee: Nissei ASB Machine Co., Ltd., Nagano, Japan

[21] Appl. No.: 08/545,651

[22] PCT Filed: May 6, 1994

[86] PCT No.: PCT/US94/05035

§ 371 Date: Jan. 26, 1996

§ 102(e) Date: Jan. 26, 1996

[87] PCT Pub. No.: WO94/26498

PCT Pub. Date: Nov. 24, 1994

[30] Foreign Application Priority Data

May 7, 1993 [JP] Japan ................................. 5/131406
Apr. 28, 1994 [JP] Japan ................................. 6/114086

[51] Int. Cl.[6] .................... B65D 1/02; B29C 49/08; B29C 49/18; B29C 49/24

[52] U.S. Cl. .................. 215/12.1; 215/12.2; 215/385; 215/902; 264/156; 264/513; 264/516; 425/525; 425/529; 425/533; 425/534; 425/538

[58] Field of Search .................. 215/12.1, 12.2, 215/385, 902; 264/156, 513, 516; 425/525, 529, 533, 534, 538; 220/461

[56] References Cited

U.S. PATENT DOCUMENTS

| | | | |
|---|---|---|---|
| 3,091,000 | 5/1963 | Makowski | ................................. 18/59 |
| 3,546,327 | 12/1970 | Ruda | ................................. 264/156 |
| 3,945,539 | 3/1976 | Sossong | ................................. 222/386.5 |
| 4,350,272 | 9/1982 | Petterson | ................................. 222/386.5 |
| 4,726,756 | 2/1988 | Aoki | ................................. 425/526 |
| 4,921,135 | 5/1990 | Pleet | ................................. 222/82 |
| 4,966,543 | 10/1990 | Krishnakumar et al. | ................. 425/522 |
| 4,979,631 | 12/1990 | Krishnaukumar et al. | ......... 215/385 X |
| 5,242,085 | 9/1993 | Richter et al. | ........................... 222/105 |
| 5,242,086 | 9/1993 | Richter et al. | ........................... 222/105 |

FOREIGN PATENT DOCUMENTS

| | | |
|---|---|---|
| 0182094 | 5/1986 | European Pat. Off. . |
| 0532873 | 3/1993 | European Pat. Off. . |
| 2676958 | 12/1992 | France . |
| 2115269 | 10/1972 | Germany . |
| 2420401 | 11/1974 | Germany . |
| 2704225 | 8/1978 | Germany . |
| 58-187319 | 11/1983 | Japan . |
| 404267727 | 9/1992 | Japan ................................. 215/12.1 |
| 0531791 | 5/1993 | Japan . |
| 1329257 | 9/1973 | United Kingdom . |
| WO9211187 | 7/1992 | WIPO . |
| WO9212926 | 8/1992 | WIPO . |

*Primary Examiner*—Sue A. Weaver
*Attorney, Agent, or Firm*—Cislo & Thomas LLP; David L. Hoffman, Esq.

[57] ABSTRACT

This invention relates to a method of molding a double-wall bottle consisting of an outer bottle (12) and an inner bottle (14). A outer bottle (12) is first formed from a first preform by biaxial Stretch blow molding. After this molding step, a plurality of air vent holes (24) are formed in a biaxially orientated region of the outer bottle (12). Next, a second preform (70) and the outer bottle (12) are set together within a first blow cavity mold (100). Subsequently, the inner bottle (24) is formed by biaxial stretch blow molding from the second preform (70) while the air within the outer bottler (12) is expelled through the air vent holes (24). Circumferential concave ribs (22) are formed around the entire circumference of the outer bottle (12), and at least one of the air vent holes (24) is formed in a region either inside or outside the region in which the circumferential concave ribs are formed.

29 Claims, 15 Drawing Sheets

DOUBLE-WALL BOTTLE AND METHOD AND APPARATUS FOR MOLDING THE SAME

DESCRIPTION

1. Technical Field

This invention relates to a double-wall bottle and a method and apparatus for molding such a double-wall bottle.

More specifically, this invention relates to a double-wall bottle consisting of inner and outer bottles, where the inner bottle can be deformed by pressure reduction and a liquid contained therein can be sucked out by pressure reduction.

2. Background Art

A typical conventional vessel containing a syrup or the like has a structure in which the syrup is discharged by a means such as a pump.

A known type of vessel of this sort is called a bag-in-box. A bag-in-box consists of a synthetic resin container capable of holding, for example, five gallons of syrup and positioned within a rectangular corrugated cardboard box. The syrup is sucked out of the synthetic resin container by pressure reduction, while the container is deformed by this pressure reduction.

However, the bag-in-box is said to have problems, as described below. One problem concerns the way in which the bag-in-box is difficult to handle when it is being transported. Another problem concerns the large number of components of the bag-in-box, such as corrugated cardboard, a resin container, resin valves, and metal springs, which are of so many different materials, they are difficult to recycle. Yet another problem is caused by the cardboard box that surrounds the synthetic resin container, making it impossible to check the amount of contents remaining in the container.

A configuration disclosed in U.S. Pat. Nos. 3,945,539, 4,350,272, and 4,921,135 is such that an inner resin container having flexibility is placed within an outer metal container, the inner container is deformed by increasing the pressure in the gap between the inner and outer containers, and thus the contents of the inner container are extracted.

In further configurations that put these techniques to practical use, each of the inner and outer containers is a resin container, the inner container is deformed by either reduced pressure or increased pressure, and thus the contents are extracted from the inner container, as disclosed in U.S. Pat. Nos. 4,966,543, 5,242,085, and 5,242,086 and International Publication Number WO 92/12926.

However, the containers disclosed in the above Publications require a release layer between the inner and outer containers. The presence of such a release layer makes it easy for the inner container to separate from the outer container, and thus enables the inner container to deform.

Further, in the methods of molding each of the containers disclosed in the above Publications, after a three-layer or five layer preform is injection-molded, a multi-layer container is formed by blow-molding from this multi-layer preform. Ordinarily, if two-layer container is molded by blow-molding from a two-layer preform in which the material of both the inner and outer layers is the same, the inner and outer layers stick together and it is not possible for the inner layer to separate from the outer layer. With the techniques disclosed in the above Publications, between the inner layer and the outer layer is provided with a release layer of a different material from that of inner and outer layers, in order to make it easy for the inner layer to separate from the outer layer in a multi-layer container formed from a multi-layer preform by blow-molding.

Further, if the above described multi-layer container is formed of three or more layers, the two or more outer layers in intimate contact with the innermost layer must be formed to have air vent holes that do not pierce this innermost layer, in order to allow at least the innermost layer to deform by reduced pressure. Techniques for forming these holes are disclosed in U.S. Pat. No. 4,966,543 and International Publication Number WO 92/12926, but it is extremely difficult to form holes in only the outer layers, without touching and damaging the very thin innermost layer.

On the other hand, techniques of forming an inner container which can be deformed by pressure reduction without the inner layer separating from the outer layer, and which is not provided with a release layer between the inner and outer layers, are disclosed in Japanese Laid-Open Patent Application Nos. 5-31791 and 58-187319.

In the method disclosed in Japanese Laid-Open Patent Application No. 5-31791, the outer bottle is molded first by biaxial stretch blow molding, a preform for the inner bottle is placed in the outer bottle, and then the inner bottle is brought into intimate contact with the outer bottle by blowing pressurized gas into the inner bottle. In the method disclosed in Japanese Laid-Open Patent Application No. 58-187319, a preform for the inner bottle, which is of a different material and has a different optimal expansion ratio from a preform for the outer bottle, is placed in the outside preform, and then gas is blown into the inside preform to expand these two preforms simultaneously.

With such a synthetic resin bottle, there is a desire for a double-wall bottle which is transparent so that the remaining amount of the contents can be observed from the outside. In manufacturing the double-wall bottle according to the foregoing methods, the problems described below have been encountered.

In the method disclosed in the first-named Application, when the preform for the inner bottle is expanded, air inside this preform is expelled through a local air expulsion groove situated near the lip portion of the preform and communicating with the outside air. Therefore there is a danger that this expulsion will not be in time if the inside preform is expanded instantaneously. Specifically, although the air remaining at the bottom of the outer bottle would have to be expelled out of the air expulsion groove immediately to match the instantaneous expansion of the preform, it is difficult to force air to flow toward the air expulsion groove so rapidly in the initial stages of the expansion, partly because of fluid resistance in space. Further, in the initial stages of the expansion, the inside preform comes into contact with the entire inner wall of the outer bottle gradually, starting from the lip portion. As a result, the expulsion path would be blocked so that air will remain is the initial stages of the expansion of the preform, thus obstructing the expulsion. Thus, if smooth expulsion is not done to match the instantaneous expansion of the inside preform, the stretch resistance of the preform would increase, which would cause incorrect expansion and thus the inner bottle will have an incorrect wall thickness distribution.

A structure intended to overcome this problem is disclosed in the second-named Application. In the method of the second-named Application, the outside preform has air vent holes. With this structure, the inside preform is molded by biaxial stretch blow molding together with the outside preform having the air vent holes. The air vent holes will also be deformed by the expansion as the preforms are expanded. Depending on the degree of deformation, there is a danger that the air vent holes could be collapsed so that they cannot function as vents. As a result, the expansion of the inner bottle tends to be obstructed. The air vent holes of the outside preform are formed by providing projections on the molding mold halves, but use of this structure means that an sufficient degree of strength of the bottle cannot be achieved. Namely, synthetic resin flows around the projections during the molding, so that weld lines are created at positions at which the diverted flows of synthetic resin meet. Therefore, the resulting bottle would be locally weak at the weld line regions, and hence might be crushed under the pressure imparted during the stretch blow molding. Accordingly it is possible that a suitable bottle can not be obtained.

Additional problems experienced with either of the foregoing conventional methods are described below.

With the bottle in which the outer bottle has air vent holes, a relatively thick wall, specifically of at least 0.1 mm, is required for the inner bottle. It is therefore difficult to deform the inner bottle by pressure reduction as the amount of the contents is reduced.

On the other hand, the concept of reducing the wall thickness of the inner bottle is disclosed in the first-named Application. However, for the above-mentioned reason i.e., because instantaneous expulsion cannot be done, a uniform wall thickness distribution is difficult to ensure during the molding. Besides, if the wall thickness is reduced as far as possible, the bottle will tend to be whitened by stress, thus deteriorating the transparency.

Another problem with the conventional art concerns the molding cycle.

Specifically, in the method disclosed in the second-named Application, the temperatures of the outer preform and the inner preform that is to be molded integrally therewith by biaxial stretch blow molding must be adjusted to the optimal expansion temperature. It is, however, difficult during the molding cycle to simultaneously insert both preforms, whose temperatures have been controlled to the optimal expansion temperatures, because the two preforms have different wall thicknesses and resin materials from each other. If the two preforms have different wall thicknesses, since the preforms have different injection times in the hot parison method and different heating times in the cold parison method, the insertion of one of the preforms must be delayed. If the two preforms have different resin materials, their respective optimal expansion temperatures are different. Therefore, with the hot parison method, it is difficult to make the two different molding cycle times coincide with each other during the molding. With the cold parison method, although it is difficult to make adjustments; molding can be performed, but in this case there is a danger that the inside and outside preforms will be fused to each other.

Namely, if the outer walls of the preforms are heated to a high temperature, the outside and inside preforms will fuse to each other when they come into contact with each other. Consequently it will be difficult for pressure reduction to deform the inner bottle molded from the inside preform.

In particular, if the two preforms are inserted together for molding, the expansion of these preforms would make them come into contact with each other before being cooled, so that it is highly likely that they will fuse to each other.

Thus, if the two preforms are inserted simultaneously, the induction cost will increase, partly because a special molding cycle would be used and partly because the cycle time would be longer.

DISCLOSURE OF THE INVENTION

With the foregoing problems in view, it is an object of this invention to provide a double-wall bottle consisting of an outer bottle, which can be ensured to have sufficient strength and an inner bottle, which can be brought into good contact with the inner wall surface of the outer bottle by stretch blow molding and which can be ensured to have flexibility so that it can be easily deformed from the contact status by pressure reduction, and also suitable transparency. The invention also provides a method and apparatus for molding such a double-wall bottle.

Another object of the invention is to provide a double-wall bottle in which the inner bottle can separate easily from the outer bottle so that it can deform as the internal pressure is reduced, as well as a method and apparatus for molding such a double-wall bottle.

To achieve the above described objects of this invention, a method of molding a double-wall bottle comprises the steps of:

biaxial stretch blow molding a first preform to form an outer bottle;

forming an air vent hole in a biaxially orientated region of the outer bottle, setting a second preform and the outer bottle into a first blow cavity mold, the second preform being placed inside of the outer bottle, the second preform having a bottomed body portion of an outer diameter smaller than the diameter of an opening of the first preform; and biaxial stretch blow molding the second preform to form an inner bottle within the outer bottle, while expelling air from within the outer bottle via the air vent hole.

In the method of this invention, the outer bottle is formed by molding a first preform by biaxial stretch blow molding, then forming air vent holes in this outer bottle. In comparison with air vent holes formed at the preform stage, these air vent holes are formed with little deformation and have dimensions almost exactly as designed. With the outer bottle inserted in a blow cavity mold having a cavity surface congruous with the contours of the outer bottle, the inner bottle is molded from a second preform by biaxial stretch blow molding using the outer bottle. During the entire blow molding of the inner bottle, from beginning to end, it is possible to expel air from between the outer and inner bottles via the air vent holes formed in the outer bottle, so that the inner bottle is not subjected to any increase in expansion resistance. It is therefore possible to ensure an optimal wall thickness distribution of the inner bottle. Since the air vent holes in the body portion of the outer bottle are formed after the outer bottle is formed by biaxial stretch blow molding, it is possible to maintain the vent holes at substantially their designed size, even during the blow molding of the inner bottle, so that smooth expulsion of air can be achieved.

Further, in the method of this invention, it is possible for the inner bottle, which is in intimate contact with the outer bottle, to separate easily from the outer bottle when it is deformed by pressure reduction. In other words, during the biaxial stretch blow molding, the preform for the inner bottle is cooled when it comes into contact with the inner wall surface of the outer bottle, because cooling takes place via the outer bottle from the cavity mold of the mold halves in contact with the outer wall surface of the outer bottle. It is therefore possible to facilitate the shaping of the inner bottle since it is hardened as heat is taken from its surface in contact with the outer bottle. Further, even when it comes into contact with the outer bottle which has previously cooled and hardened, the inner bottle does not fuse with the outer bottle, and therefore the inner bottle can be separated from the outer bottle without difficulty when it is deformed by pressure reduction. Thus the resistance encountered when the inner bottle is deformed by pressure reduction can be removed.

The air vent holes formed in the outer bottle of the double-wall bottle of the present invention, which is molded as described above, also act as air passageways to allow the inner bottle to deform under reduced pressure as the contents contained in the inner bottle are sucked out of the inner bottle by reduced pressure.

When the method of this invention is implemented, the first blow cavity mold is configured of a plurality of split molds that can freely open and close with respect to each other, at least one of the split molds has an air expulsion groove communicating from a cavity surface of the split mold to an outer surface thereof, and this air expulsion groove can employ a structure formed in a parting surface of the split mold. In this case, the air expelled from within the outer bottle via the air vent holes during the step of biaxial stretch blow molding the inner bottle is exhausted out of the first blow cavity mold via the air expulsion groove.

At this point, the air vent holes could be formed in a plurality of positions along a longitudinal axial direction of the outer bottle and the air expulsion groove of the split mold could be formed such that the shape thereof on the side in the cavity mold is of a longitudinally extended groove extending over the length of the region in which the plurality of air vent holes are formed along the longitudinal axial direction of the outer bottle. With this configuration, during the step of biaxial stretch blow molding the inner bottle, the air expelled via the air vent holes formed at different positions in the longitudinal axial direction of the outer bottle can be exhausted to the outside of the mold via the longitudinally extended groove together with the air vent holes.

The method of this invention is further characterized in that, during the step of biaxial stretch blow molding the outer bottle, a plurality of circumferential concave ribs are formed at a plurality of positions along the longitudinal axial direction of the outer bottle, in such a manner as to extend around the entire circumference of the outer bottle and be indented toward the interior of the outer bottle;

during the step of forming the air vent holes, at least one of the plurality of air vent holes is formed within the region in which the circumferential concave ribs are formed in the outer bottle;

during the setting step, a part of the circumferential concave rib of the outer bottle are arranged to correspond to the air expulsion groove in the split mold; and during the step of biaxial stretch blow molding the inner bottle, air is exhausted via gaps between the cavity surface of the first blow cavity mold and the circumferential concave ribs.

With this configuration, the positions of the air vent holes of the outer bottle and the air expulsion grooves of the first cavity mold are such that the air can be exhausted, even if these positions are displaced in the circumferential direction.

The air vent holes and the air expulsion grooves are connected by annular air passageways formed between the circumferential concave ribs and the cavity surface.

Since the outer bottle of the double-wall bottle formed by this method is reinforced by the circumferential concave ribs, the outer bottle can be controlled to not deform even when the contents are sucked out by reduced pressure. Therefore, the inner bottle can separate easily from the outer bottle when the contents are sucked out by reduced pressure, without requiring any kind of release layer between the inner and outer bottles.

The air vent holes can be formed outside a region in which the circumferential concave ribs are formed in the outer bottle. In such a case, the air in the region bounded by upper and lower circumferential concave ribs and the preform for the inner bottle can be exhausted via the air vent holes during the expansion process.

Circumferential convex ribs could be formed in the cavity surface of the first blow cavity mold at positions corresponding to the circumferential concave ribs of the outer bottle. With this configuration, a mating between the circumferential concave ribs and the circumferential convex ribs prevents deformation of the outer bottle during the step of biaxial stretch blow molding the inner bottle. This pulls the inner bottle toward the bottom portion of the outer bottle during the expansion process of the inner bottle, and can prevent the formation of wrinkles in the bottom portion of the outer bottle.

With the method of this invention, a configuration can be used in which a circumferential groove, which communicates with air expulsion grooves formed in a parting surface of the split molds that form the first blow cavity mold, is formed in a cavity surface of the split mold. With this configuration, an air expulsion passageway can be ensured by the circumferential groove that provides a connection between the air expulsion grooves and the air vent holes, even if the positions of the air expulsion grooves and the air vent holes are displaced. Alteratively, a configuration can be used in which the air vent holes are provided communicating from the cavity surface of the split molds that form the first blow cavity mold to the outer wail thereof In the method of this invention, coolant passageways are preferably formed in the split molds, and the inner bottle molded within the outer bottle by biaxial stretch blow molding is cooled by the split molds via the outer bottle.

The method of this invention further provides a structure in which the first blow cavity mold is configured of a plurality of split molds including a bottom mold;

the first blow cavity mold is configured of a plurality of split molds including a bottom mold;

the step of forming the air vent hole includes a step of forming the air vent hole in a bottom portion of the outer bottle, substantially corresponding to a parting surface of the bottom mold; and during the step of biaxial stretch blow molding the inner bottle, air expelled via the air vent hole formed in the bottom portion of the outer bottle is exhausted via gaps on the parting surface of the bottom mold.

In the double-wall bottle molded by the above method, the outer bottle has a domed bottom formed so as to protrude toward the interior of the outer bottle, with a base portion formed around the domed bottom, and air vent holes penetrating from an outer wall of the outer bottle to an inner wall thereof are formed in the base portion or in the vicinity, thereof.

During the step of forming the air vent holes, air vent holes could be formed in the bottom portion and the body portion of the outer bottle, and the number and/or total opening area of the air vent holes formed in the bottom portion and the body portion could be set to be such that an opening ratio per unit area of the bottom area is larger than that; of the body portion. In the final stages of the step of biaxial stretch blow molding the inner bottle, air can easily become trapped in the bottom portion of the outer bottle. By forming air vent holes of a large opening ratio in the bottom portion, the air concentrating in the bottom portion can be efficiently exhausted and thus the outer bottle and the inner bottle can be brought into intimate contact, even in the bottom portion.

By making the opening ratio of the bottom portion larger in the double-wall bottle molded by the above method, it is possible to allow air to flow in efficiently between the inner and outer bottles while the contents are being sucked out, and thus the deformation by pressure reduction of the bottom portion of the inner bottle can be performed efficiently right from the beginning. This means that virtually all of the contents can be sucked out of the inner bottle.

The method described below can be employed to form the air vent holes in the outer bottle in accordance with this invention. First, during the step of forming the air vent holes, it is preferable to drive heated hole-piercing members forward and backward relative to the outer bottle to form the air vent holes. This removes the danger of damage such as cracking that could occur in the outer bottle while the air vent holes are being formed. The step of forming the air vent holes could be implemented within a second blow cavity mold used during the biaxial stretch blow molding of the first preform into the outer bottle. In this case, the air vent holes are formed by hole-piercing members protruding from a cavity surface of the second blow cavity mold. This step of forming the air vent holes could also be implemented by driving heated hole-piercing members forward and backward relative to the outer bottle, after the outer bottle has been removed from the second blow cavity mold used during the biaxial stretch blow molding of the first preform into the outer bottle. In that case, the outer bottle could be driven intermittently, with the heated hole-piercing members being driven forward and backward when the rotation is stopped. This process makes it easy to form the air vent holes at a plurality of locations around the circumferential direction of the outer bottle.

The method described below could be employed for inserting the second preform for the inner bottle into the outer bottle. First, a step of adjusting the temperature of the second preform to a suitable temperature for expansion is provided before the step of setting the second preform in the first blow cavity mold, then the second preform is inserted in such a manner that the outer bottle surrounds the second preform. In particular, if the temperature is adjusted by a temperature conditioning pot surrounding the second preform, sufficient space can be reserved for the insertion by simply lowering the temperature conditioning pot after the temperature adjustment step. The second preform and the outer bottle could be set together in the first blow cavity mold. In such a case, the first blow cavity mold could be configured of a plurality of split molds including a bottom mold, and the outer bottle is mounted on the bottom mold.

The double-wall bottle of this invention consists of an outer bottle having a biaxially oriented body portion and an inner bottle positioned within the outer bottle and having a biaxially oriented body portion, wherein:

the body portion of the outer bottle has a wall thickness of at least 0.3 mm and has an air vent hole in a biaxially orientated region of the outer bottle;

the body portion of the inner bottle has a wall thickness of at most 0.08 mm; and the inner bottle is deformable by pressure reduction as a substance contained therein is sucked out of the inner bottle.

According to this invention, since the body portion of the outer bottle has a wall thickness of at least 0.3 mm, the outer bottle is self-supporting against any deformation by pressure reduction when the contents are sucked out and it can be ensured to have a strength suitably resistant; to impact during transportation. On the other hand, since the body portion of the inner bottle has a wall thickness of at most 0.08 mm, the inner bottle is flexible enough to deform in answer to pressure reduction. Further, since the body portion of the outer bottle has a plurality of air hole vents at positions spaced in the longitudinal axial direction, air can be expelled and injected smoothly when the inner bottle expands and contracts.

If both the outer and inner bottles have transparent body portions, it would be easy to check the remaining amount of contents. It is also preferable that the body portion of the inner bottle should have a wall thickness of at least 0.04 mm. It would be difficult for such an inner bottle to become whitened due to stress during the blow molding, thus ensuring transparency for the inner bottle.

The body portion of the outer bottle preferably has circumferential concave ribs and also air vent holes in the circumferential concave ribs. When this outer bottle is inserted into the blow cavity mold, it is possible to define annular air passageways between the cavity surface and the circumferential concave ribs of the bottle body portion so that the air inside the outer bottle can be expelled via the air vent holes of the outer bottle and the air passageways.

The outer bottle preferably has a first flange at its lip portion and the inner bottle has a second flange at its lip portion that is engageable with the upper surface of the first flange. With these flanges, since the body portion of the inner bottle expands to a diameter larger than the diameter of the opening of the lip portion of the outer bottle, it is possible to prevent the inner bottle from being removed from the outer bottle.

If the inner bottle is provided with a reinforcing rib portion in a region below the lip portion that has a diameter larger than the opening defined by the lip portion of the outer bottle, the above removal prevention means can be made more reliable.

Further, the first and second flanges could be provided with a rotation stop means that prevents the outer and inner bottles from moving circumferentially relative to each other, wherein the rotation stop means include a pair of coacting engaging portions situated on the first and second flanges, respectively, so as to be engageable with each other.

Both the outer and inner bottles are preferably made of polyethylene terephthalate (PET) resin, which has excellent biaxial stretch blow molding properties. PET resin has an excellent transparency because of its uniformly oriented crystals, and thus is possible to construct a double-wall bottle which is also extremely recyclable, by making both the outer and inner bottles of PET resin.

An apparatus for molding the double-wall bottle of this invention comprises:

a means of forming an outer bottle by biaxial stretch blow molding a first preform;

a means of forming an air vent hole in a biaxially orientated region of the outer bottle;

a means of setting a second preform and the outer bottle into a first blow cavity mold, the second preform being placed inside of the outer bottle, the second preform having a bottomed body portion of an outer diameter smaller than the diameter of an opening of the first preform; and a means of forming an inner bottle within the outer bottle by biaxial stretch blow molding the second preform while expelling the air within the outer bottle through the air vent hole.

This apparatus can also be provided with:

a first blow molding machine that injection-molds the first preform and forms the outer bottle by biaxial stretch blow molding from the first preform while retaining the heat with which the first preform is injection-molded;

a second blow molding machine that injection-molds the second preform and forms the inner bottle by biaxial stretch blow molding from the second preform while retaining the heat with which the second preform is injection-molded and which is placed within the outer bottle; and a conveyor means that supplies and conveys the outer bottle, ejected from the first blow molding machine, to the second blow molding machine at a timing that matches the timing of the biaxial stretch blow molding of the inner bottle.

In this case, the air vent hole formation means is provided part way along a path along which the outer bottle is supplied and conveyed to the second blow molding machine.

A number N (where N≧1) of the second blow molding machines and a number M (where M>N) of the first blow molding machines could be provided connected by the conveyor means. The molding cycle time of the first blow molding machine for forming outer bottles is slower than that of the second blow molding machine because the thickness of the first preform is greater than that of the second preform. In such a case, if the number of second blow molding machines is greater than the number of first blow molding machines, the second blow molding machines lose no time due to waiting for outer bottles to be supplied, thus improving the production efficiency.

BRIEF DESCRIPTION OF THE DRAWINGS

FIGS. 8A, and 8B are schematic sectional views of a double-wall bottle of this invention, in which FIG. 8A and FIG. 8B show the step of inserting the inner bottle;

BEST MODE FOR CARRYING OUT THE INVENTION

A double-wall bottle and a method of molding the double-wall bottle according to this invention will now be described with reference to the accompanying drawings.

Figure 1:
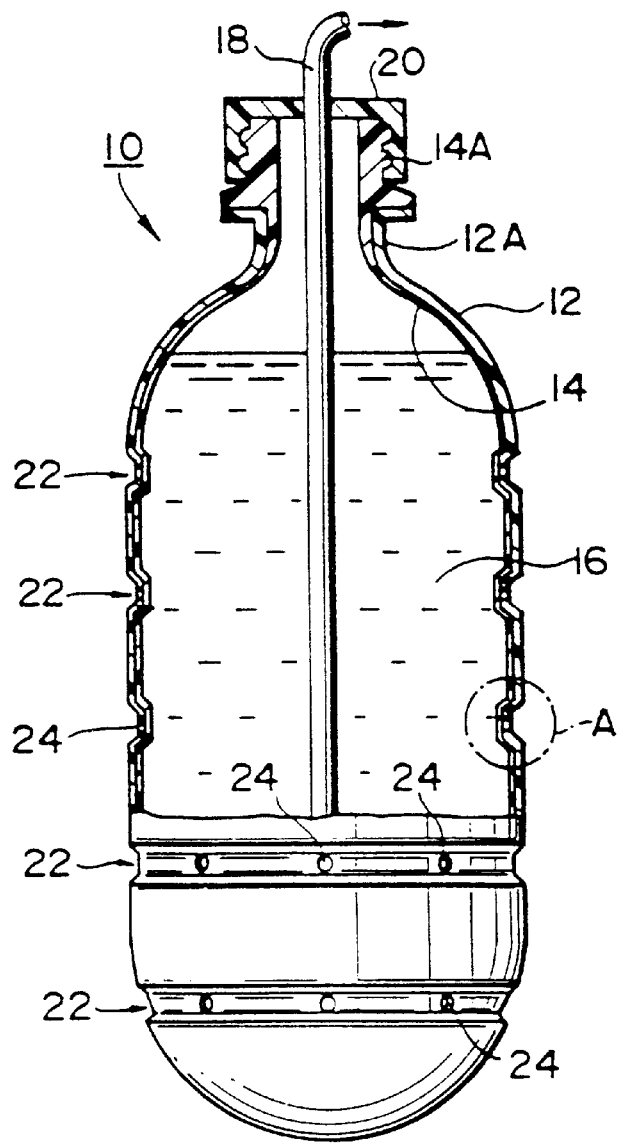
FIG. 1 is a front view partly in section of a double-wall bottle embodying this invention.

FIG. 1 is a sectional view showing a double-wall bottle 10 according to one embodiment of this invention.

The double-wall bottle 10 comprises an outer bottle 12 and an inner bottle 14, with contents 16 such as post-mix soft drink syrup within the inner bottle 14. The contents 16 are discharged outside by suction through a flexible hose 18 connected at one end to a suction pump (not shown in the figure). For this purpose, the hose 18 is coupled to a cap 20 mounted on the lip portion of the double-wall bottle 10 and the other end thereof extends into the contents 16.

Figure 20:
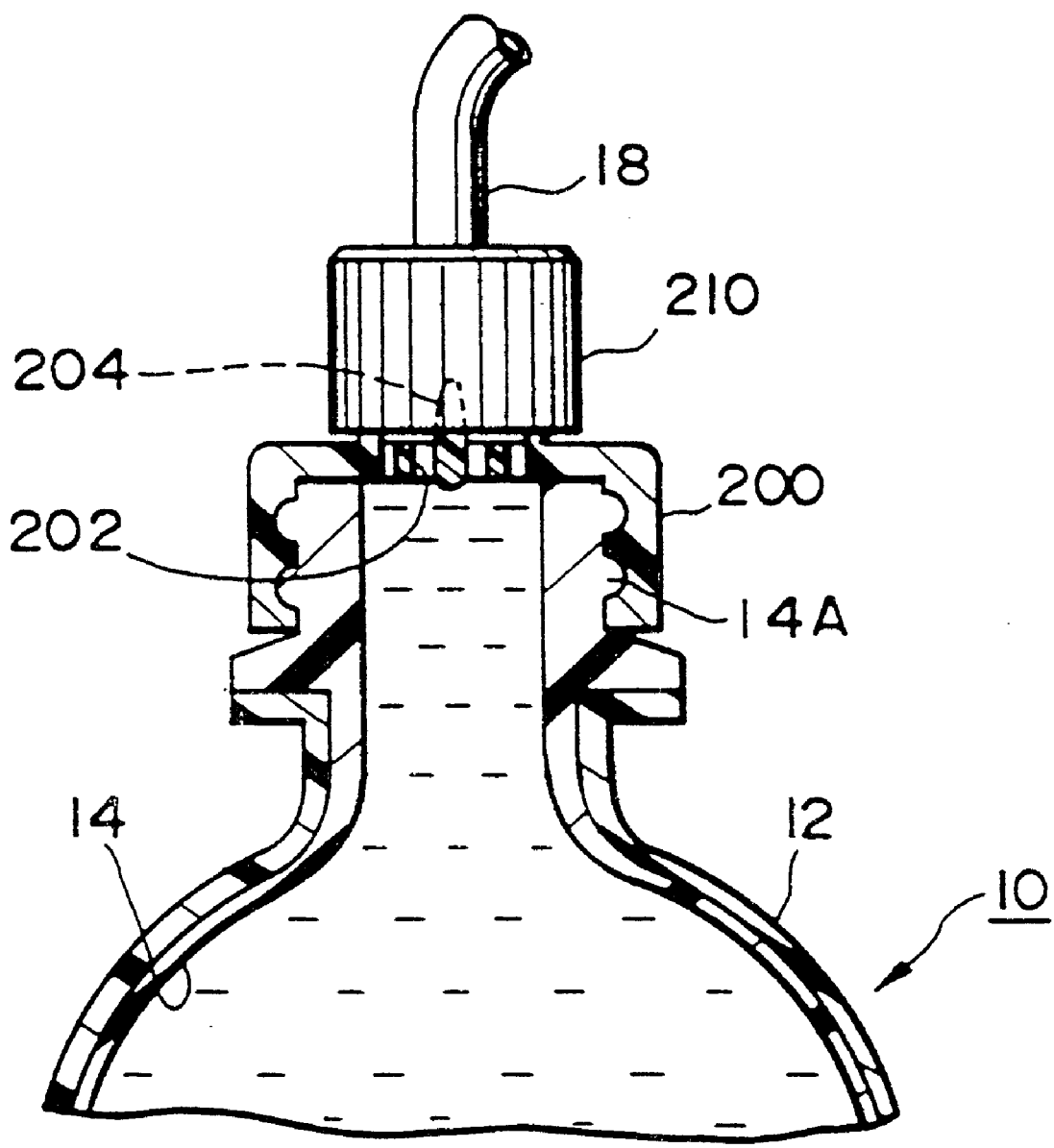
FIG. 20 is a sectional view of the top portion of a bottle and of a structure for extraction of the content thereof as disclosed in U.S. Pat. No. 5,242,085.

Note that a method to extract the content 16 from within the double-wall bottle 10 to outside is not limited to one that inserts the hose 18 into the bottle as shown in FIG. 1. A structure for extraction of the content disclosed in U.S. Pat. No. 5,242,085 is shown in FIG. 20. According to the structure, a cap 200 is attached to the neck portion 14A of the double wall bottle, and a coupling 210 is attached to the cap 200. The hose 18, which is connected to the coupling 210, does not extend to the interior of the double wall bottle 10. The cap 200 includes a plurality of holes 202 for evacuating the content 16 therefrom by pressure reduction. In addition, the cap 200 includes a pin 204 to actuate (open) the valve (not shown) in the coupling 210 in the manner known in the art as the coupling 210 is attached to the cap 200.

Figure 5:
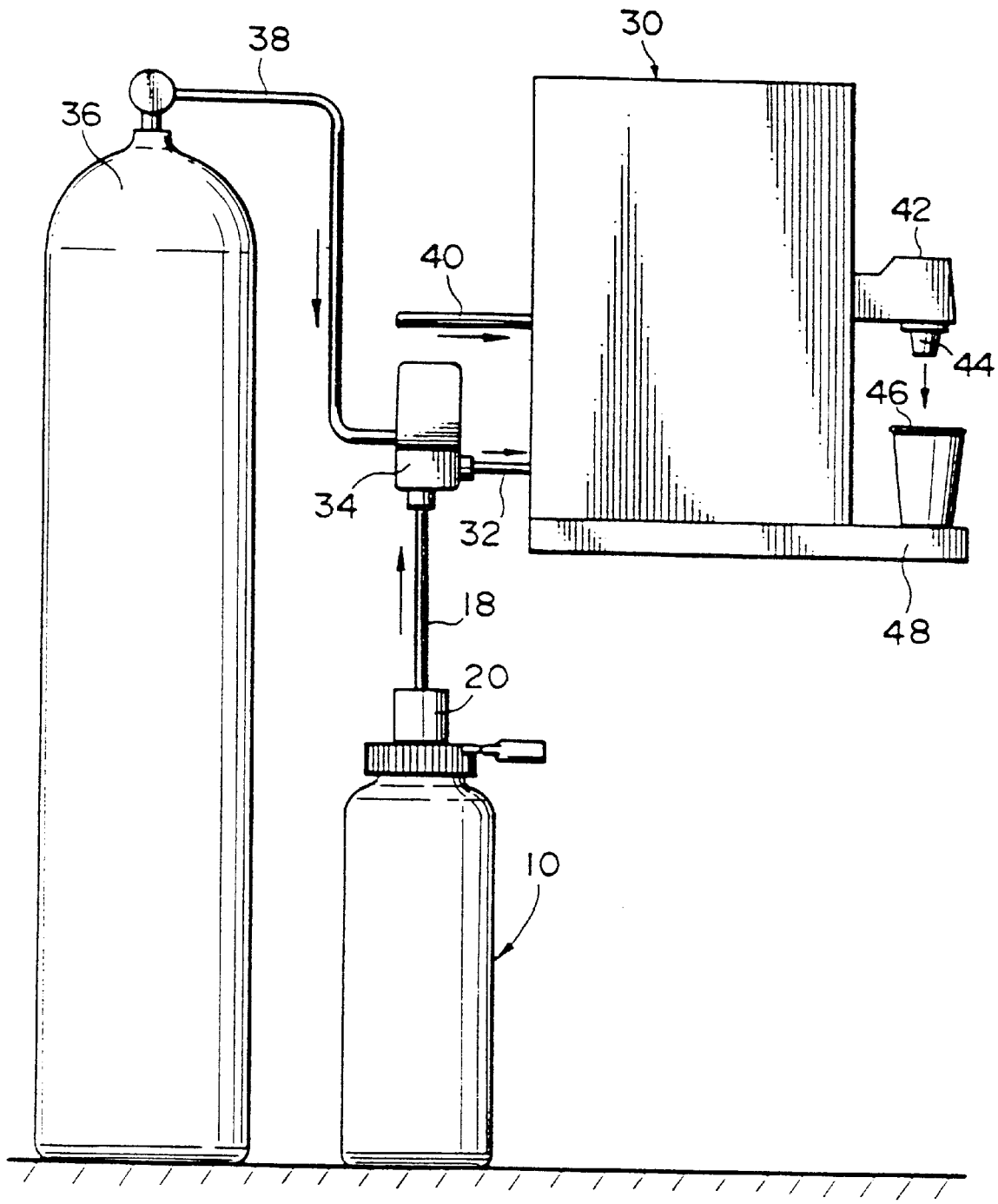
FIG. 5 is a schematic illustrative view of a dispensing system including a double-wall bottle of this invention.

The configuration of a system that dispenses syrup from the double-wall bottle 10 will now be described with reference to FIG. 5. The hose 18 connected to the double-wall bottle 10 is connected to a pump 34, and the pump 34 is connected via a syrup line 32 to a dispenser 30. The pump 34 is connected to, for example, a $CO_2$ source 36 via a $CO_2$ line 38, and is operated by $CO_2$ gas supplied from the $CO_2$ source 36. Any known type of dispenser can be used as the dispenser 30, to which a syrup line 32, which will be described later, and a water supply line 40 are connected. The dispenser 30 has a plurality of valves 42. By opening any one of these valves 42, an operator can cause a selected beverage to be dispensed through a nozzle 44 into a cup 46 placed on a drip tray 48. Note that, in order to make it easy to replace the double-wall bottle 10, the above described cap 20 attached to the lip portion of the double-wall bottle 10 can make use of a known quick-disconnect coupling.

Both the inner and outer bottles 12 and 14 are molded by biaxial stretch blow molding using the same kind of material. In the illustrated embodiment, the material was polyethylene terephthalate (PET), which has excellent expansibility and transparency.

Since the outer bottle is molded from a preform of PET resin by biaxial stretch blow molding, has a transparent body portion. The body portion has a wall thickness of preferably at least 0.3 mm, and more preferably between 0.3 mm and 0.45 mm, in order to ensure sufficient deforming strength and transparency to enable the contents to be seen.

Likewise, since the inner bottle is molded from a preform of PET resin by biaxial stretch blow molding, it also has a transparent body portion.

The wall thickness of the body portion of the inner bottle 14 is preferably at most 0.08 mm in order to ensure flexibility to facilitate deformation due to pressure reduction. The inner bottle 14 can therefore be deformed by pressure reduction as the contents are reduced by suction.

It is more preferable if the wall thickness of the body portion of the inner bottle 14 is at least 0.04 mm in order to prevent the inner bottle 14 from whitening due to stress during the blow molding and to thereby ensure sufficient transparency.

The body portion of the outer bottle 12 has a plurality of circumferential concave ribs 22 at positions spaced in the longitudinal axial direction. This increases the mechanical strength of the outer bottle 12. Therefore, since the outer bottle 12 is reinforced by the circumferential concave ribs 22, it does not deform when the inner bottle 14 within it is deformed by pressure reduction, so that separation of the outer wall of the inner bottle 14 from the inner wall of the outer bottle 12 is facilitated without the need of a release layer on either wall. The body portion also has a plurality of air vent holes 24 in the regions of the circumferential concave ribs 22.

Figure 2:
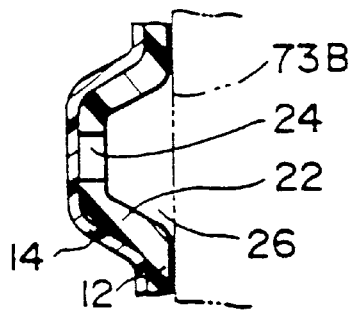
FIG. 2 is an enlarged sectional view showing a portion A of FIG. 1.

Specifically, as shown in FIG. 2, each circumferential concave rib 22 extends around the entire circumference of the body portion of the outer bottle 12 and is depressed inward, and has in its bottom portion a number of the air vent holes 24 which are spaced from one another along the circumferential concave rib 22, with each extending through the body portion wall.

The air vent holes 24 are formed in, for example, a blow cavity mold used in the biaxial stretch blow molding of the outer bottle 12. The air vent holes 24 are therefore free from any deformation once they are formed. This is because the biaxial stretch blow molding is at the final stage of the formation of the outer bottle 12, and the body portion is not expanded subsequently.

Each circumferential concave rib 22 formed around the circumference of the outer bottle 12 also serves as an air passageway for directing the air which remains inside the outer bottle to the air expulsion portion of the blow cavity mold when the inner bottle 14 is molded by biaxial stretch blow molding. This status, namely the relationship between the blow cavity mold and the circumferential concave ribs 22 when the inner bottle 14 is molded by biaxial stretch blow is shown in FIG. 2 in which the dash-and-two-dot lines indicate a cavity surface 73B of the blow cavity mold. An air passageway 26 constituted between the circumferential concave rib 22 and the cavity surface 73B is thereby formed to communicate in the circumferential direction. Therefore, the air expelled from within the outer bottle 12 will flow into the air passageway 26 from the air vent holes 24 and then will be exhausted to the outside via the air passageway formed in the parting surface of the blow cavity mold as will be described.

Figure 3A:
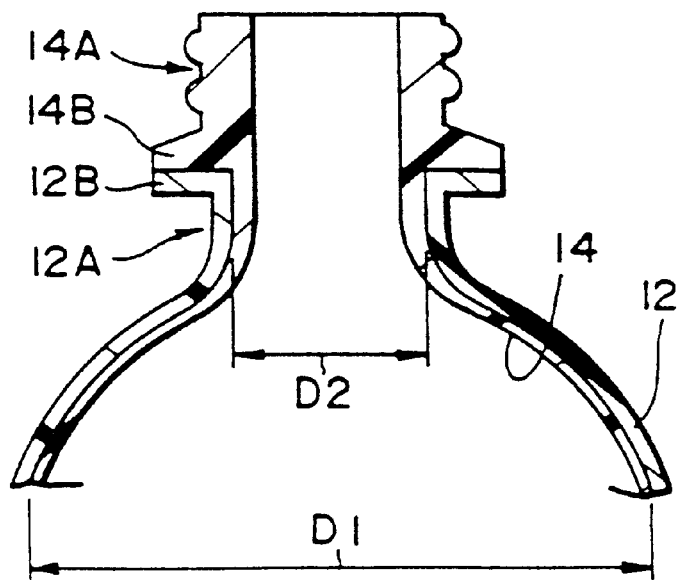
FIG. 3A is a sectional view showing a lip portion of the double-wall bottle of FIG. 1

A lip portion 14A of the inner bottle 14 is integrally superposed on a lip portion 12A of the outer bottle 12, as shown in FIG. 3A. The lip portion 14A of the inner bottle 14 has on its outer circumferential surface a thread portion on which a cap is to be screwed, and also has on its base a second flange 14B. This second flange 14B is superposed on the upper surface of a first flange 12B formed on the lip portion 12A of the outer bottle 12. This means that the inner bottle 14 extends from the opening of the lip portion 14A, through which the contents are to be inserted, to the remaining entire part, in which the contents are to be accommodated. The contents accommodated in the inner bottle 14 are therefore kept from coming into contact with the outer bottle 12 along the range from the opening of the lip portion to the bottom. If the inner bottle 14 is molded from a so-called virgin material, the contents are prevented from deteriorating even when a recycled material is used for the outer bottle 12.

The second flange 14B and the body portion of the inner bottle 14 jointly serve to prevent the inner bottle 14 from being removed out of the outer bottle 12. Namely, the outer diameter (D1) of the body portion extending from the lip portion 14A of the inner bottle 14 is larger than the diameter (D2) of the opening of the lip portion 12A of the outer bottle 12. The outer bottle 12 and inner bottle 14 are therefore prevented from mutually separating because the first flange 12B of the outer bottle 12 and the body portion of the outer bottle 12 are sandwiched between the lower surface of the second flange 14B and the body portion of the inner bottle 14.

Figure 3B:
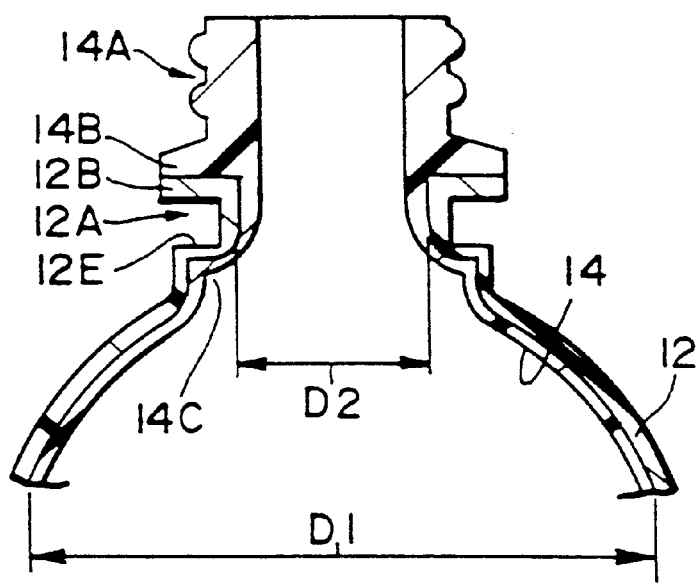
FIG. 3B is a sectional view showing a lip portion of another embodiment.

The structure shown in FIG. 3B can be used additionally as a removal prevention means. In FIG. 3B, a reinforcing, rib or stepped portion 14C is formed as close as possible to the lip portion 12A of the outer bottle 12, over a region of a diameter greater than the diameter D2 of the opening of the outer bottle 12. The formation of this reinforcing rib 14C causes a rib 12E to be formed in the corresponding portion of the outer bottle 12. Since the portion of the inner bottle 14 reinforced by the rib 14C is difficult to deform, the inner bottle 14 is prevented from being removed from the outer bottle 12. Alternatively, instead of forming the rib 14C in the inner bottle 14, or to further supplement it, a non-deformable structure could be used in which the wall in the region corresponding to the rib 14C is made comparatively thicker.

Figure 4:
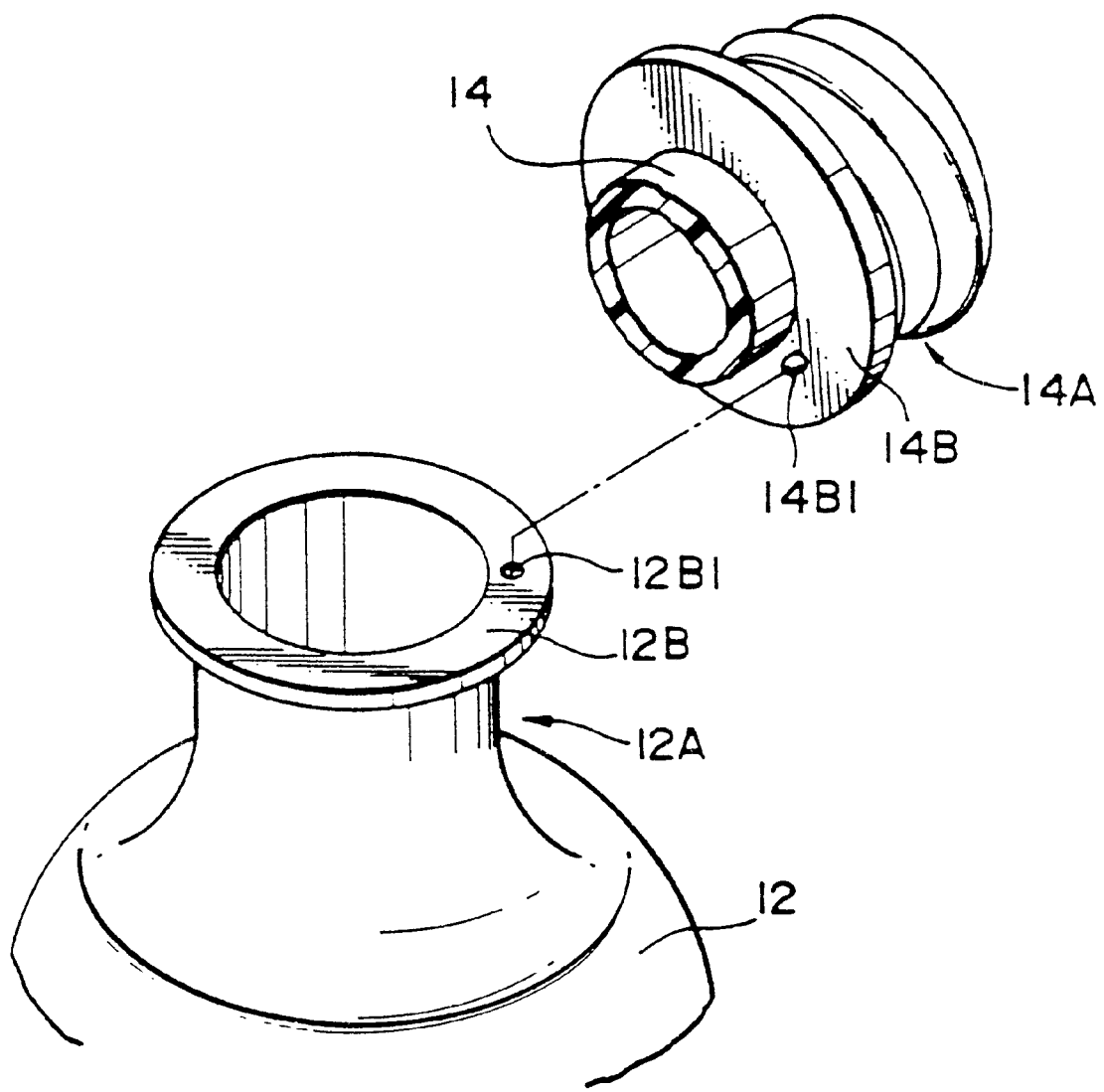
FIG. 4 is a fragmentary exploded perspective view showing the lip portion of FIG. 3A.

Further, the first and second flanges 12B and 14B carry on their confronting surfaces a rotation stop means for preventing the two bottles from mutually rotating. FIG. 4 shows the confronting surfaces of the lip portions. As shown in FIG. 4, an engaging hole 12B1 is formed in the upper surface of the first flange 12B, and an engaging pin 14B1 engageable with the engaging hole 12B1 is integrally formed on the lower surface of the second flange 14B. The inner bottle 14 is preventing from rotating with respect to the outer bottle 12 by fitting the engaging pin 14B1 on the second flange 14B into the engaging hole 12B1 of the first flange 12B.

The method of molding the double-wall bottle 10 of FIG. 1 will now be described.

FIGS. 6 to 9 illustrate the molding steps.

The molding method of this invention comprises the following steps:

(1) molding a preform for the outer bottle;
(2) controlling the temperature of the outside preform and molding it by biaxial stretch blow molding to form the outer bottle;
(3) forming air vent holes in the outer bottle;
(4) molding another preform for the inner bottle;
(5) controlling the temperature of the inside preform and inserting the inside preform into the outside bottle; and (6) molding the inside preform by biaxial stretch blow molding to form the inner bottle.

The individual molding steps will now be described in detail.

(1) In this step, a preform 50 for the outer bottle is molded by, for example, injection molding. Since this step requires no special process for the preform, it may be carried out by an ordinary injection molding process.

Figure 6:
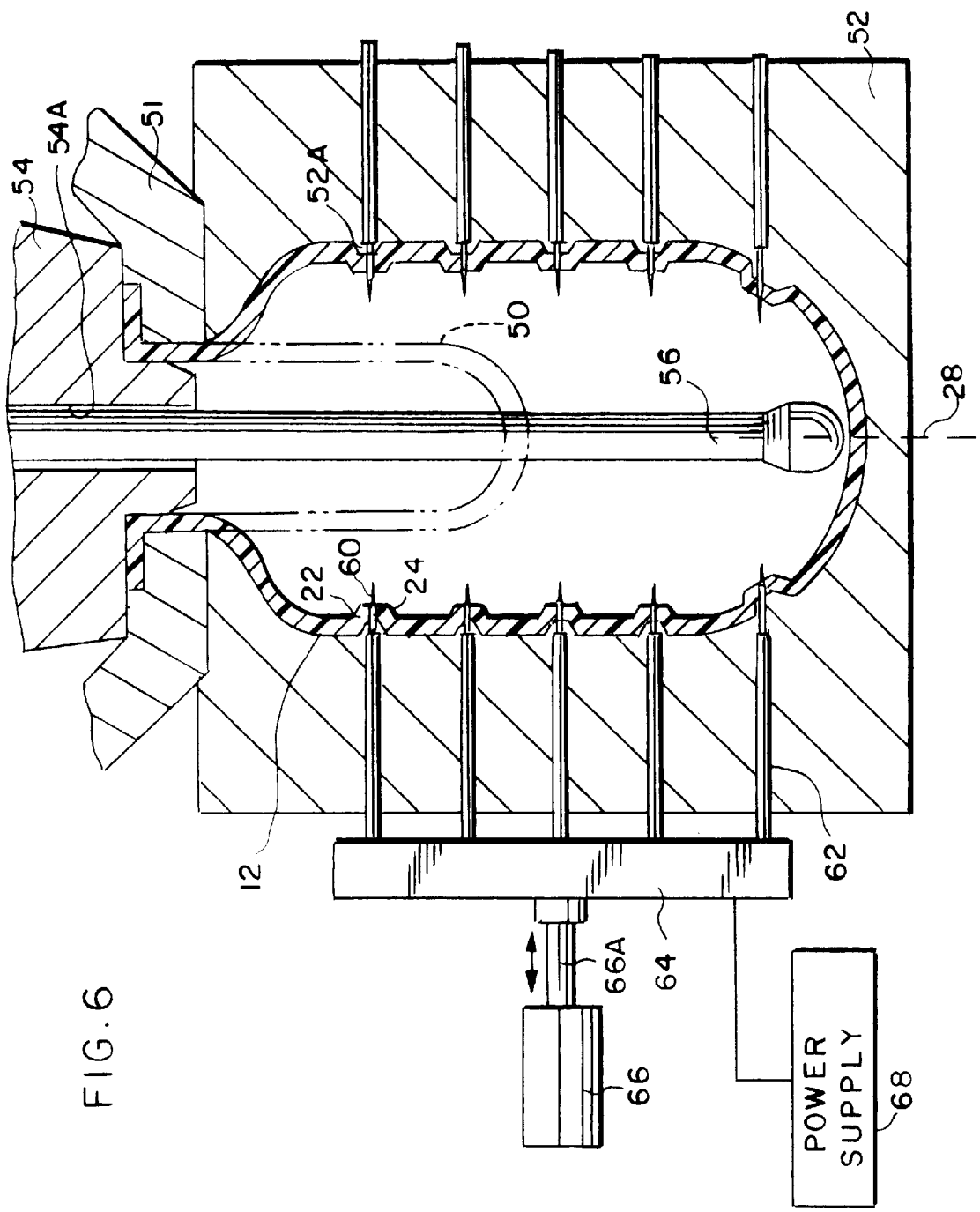
FIG. 6 is a schematic sectional view showing the process of biaxial stretch blow molding an outer bottle.

(2) In this step, as shown in FIG. 6, after the outside preform 50 is conveyed clamped by a lip mold 51 and the temperature is controlled to an optimal expansion temperature, the outside preform 50 is set in a blow cavity mold 52 for molding the outer bottle. The blow cavity mold 52 has an inwardly indented cavity surface 52A for molding the circumferential concave ribs 22 which are to be molded in the body portion of the outer bottle 12. A blow core mold 54 is inserted into the lip portion of the outside preform 50. Further, an stretching rod 56 passing through an air passageway 54A of the blow core mold 54 is placed within the outside preform 50. Thus, the outside preform 50 is expanded in the longitudinal axial direction by the stretching rod 56 and also in the transverse axial direction by the blowing of air introduced through the blow core mold 54, so that it is biaxially expanded. While it is thus expanded, the circumferential concave ribs 22 are formed in the body portion. The wall thickness of the body portion of the outer bottle 12, formed by the biaxial stretch blow molding, is preferably set to be at least 0.3 mm. Therefore, sufficient deforming strength and sufficient transparency can be ensured for the resulting outer bottle 12.

(3) In this step, as shown in FIG. 6, the blow cavity mold 52 for biaxial stretch blow molding is used. The blow cavity mold 52 carries needles 60 which project retractably from the inwardly indented cavity surface that forms the circumferential concave ribs 22, toward the center of the mold 28. These needles 60 are provided to form the air vent holes 24 in the body portion of the outer bottle 12. For this purpose, the needles 60 are arranged at positions spaced around the circumferential direction of the cavity surface corresponding with the positions at which the air vent holes 24 are to be formed. The needles 60 are heated so that they can pierce the body portion easily. The heating temperature for the needles 60 is preferably higher than the temperature to which the outside preform is controlled. Therefore, expanding the outside preform 50 in the transverse direction will bring it into contact with the cavity surface to form the circumferential concave ribs 22. After that, for example, the air vent holes 24 are formed by the needles 60. Since the air vent holes 24 are formed in the final molding step rather than during the molding of the outside preform, the holes are unlikely to deform or collapse, compared with the case in which the air vent holes 24 are formed in the preform.

Next, an example of the drive mechanism of the needles 60 will be described, with reference to FIG. 6. Hole-piercing means for forming the air vent holes 24 arranged in a line along the longitudinal axial direction of the outer bottle 12, such as the needles 60, are each fixed to ends of a plurality of shafts 62. The other ends of the shafts 62 extend out of the blow cavity mold 52 and are fixed to a movable plate 64. This movable plate 64 is linked to a rod 66A that is driven forward and backward by an air cylinder 66.

When the outer bottle 12 is to be formed within the blow cavity mold 52, the movable plate 64 is retracted by the air cylinder 66. As a result, the points of all of the needles 60 are retracted to a position at which they do not protrude from the cavity surface of the blow cavity mold 52. After the outer bottle 12 has been formed in the blow cavity mold 52, the air cylinder 66 is driven to drive all of the needles 60 50 as to protrude from the cavity surface and thus form the air vent holes 24 in the body portion of the outer bottle 12. The movable plate 64 could also be connected to a heater power source 68. In such a case, heaters connected to the needles 60 are installed within the movable plate 64 and the shafts 62 and these heaters are heated by the power source 68, so that the needles 60 can be heated to a temperature at which they can easily form the air vent holes 24.

After the outer bottle 12 has been formed in the blow cavity mold 52 and the air vent holes 24 have been formed therein by the needles 60, the outer bottle 12 is taken out of the blow cavity mold 52 by a mold opening means.

Figure 7A:
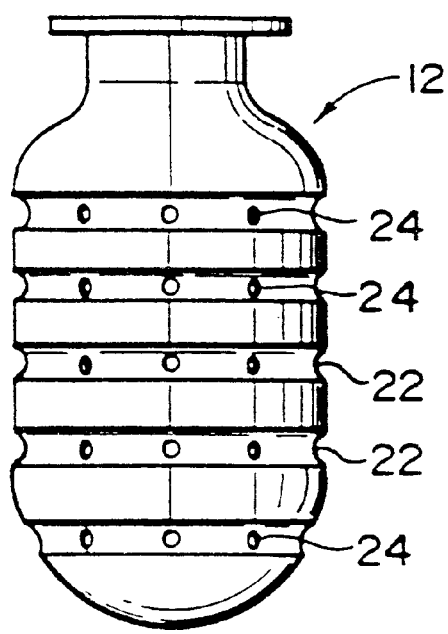
FIG. 7A and FIG. 7B are front views of an outer bottle and a preform for an inner bottle, respectively.

Then, as shown in FIG. 7A, the outer bottle 12 is taken out from the lip mold 51 by a non-illustrated ejection mechanism. The outer bottle 12 is then hardened by, for example, natural cooling.

Figure 7B:
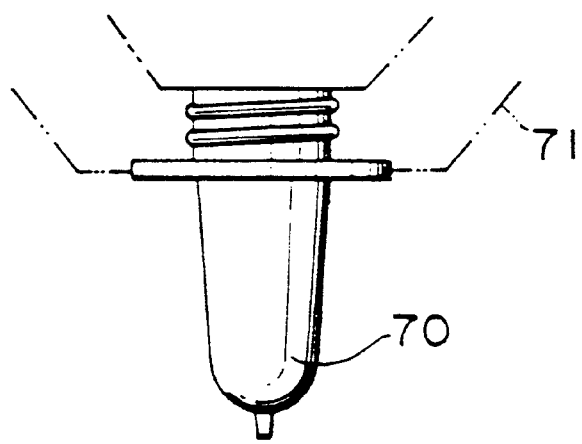
Figure 8A:
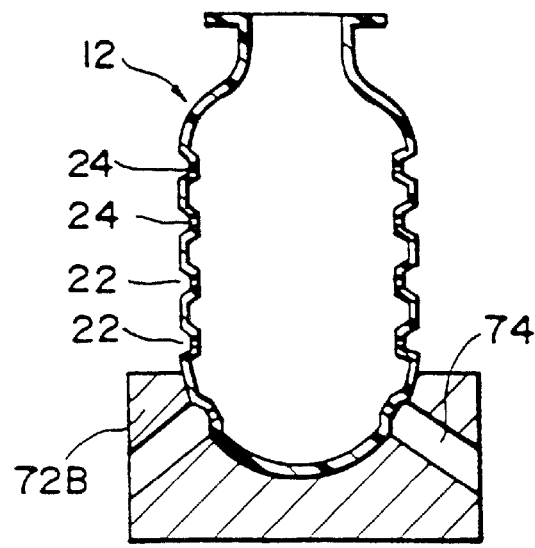
Figure 8B:
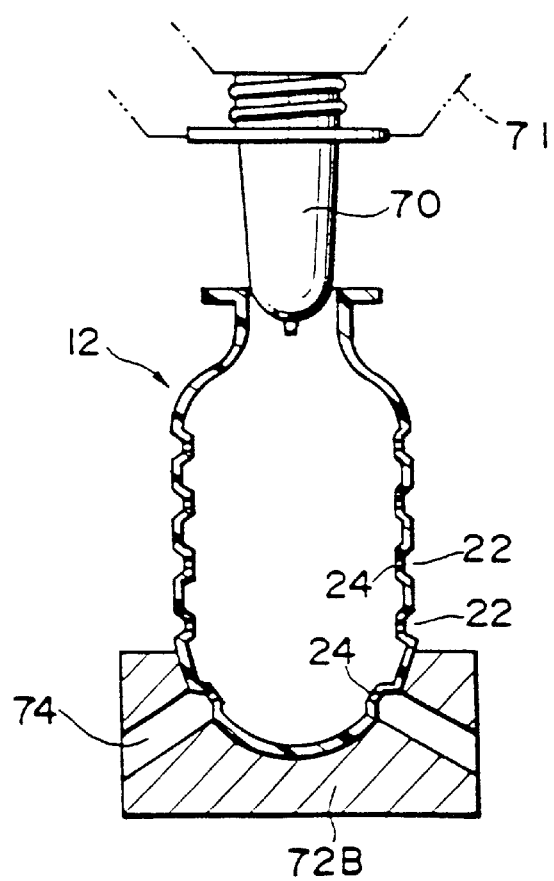

(4) In this step, as shown in FIG. 7B, a preform 70 for the inner bottle 14 is molded by injection molding in a similar manner to the outer bottle 12. The inside preform 70 should preferably be injection molded under conditions such that the wall of the inside preform 70 is not too thin. This prevents deterioration of the fluidity of the resin that flows between the confronting cavity surfaces of the injection cavity mold and the injection core mold. If the fluidity of the resin were to deteriorate, a so-called short shot phenomenon in which resin is not fully supplied over the entire cavity surface could occur, or it may be necessary to lengthen the cycle time until the resin is fully supplied. Therefore, in this embodiment the inside preform 70 has a wall thickness of about 2 mm. The length of the inside preform 70 in the longitudinal axial direction based on this wall thickness is set in view of the air expulsion pressure and the expansion rate, in such a manner that the wall thickness after the final molding step preferably ranges between 0.04 mm and 0.08 mm. In this embodiment, the length of the inside preform 70 is approximately half that of the outside preform 50. Thus the setting of the wall thickness is an important factor in the expansion molding, to ensure the transparency of the preforms.

Figure 10:
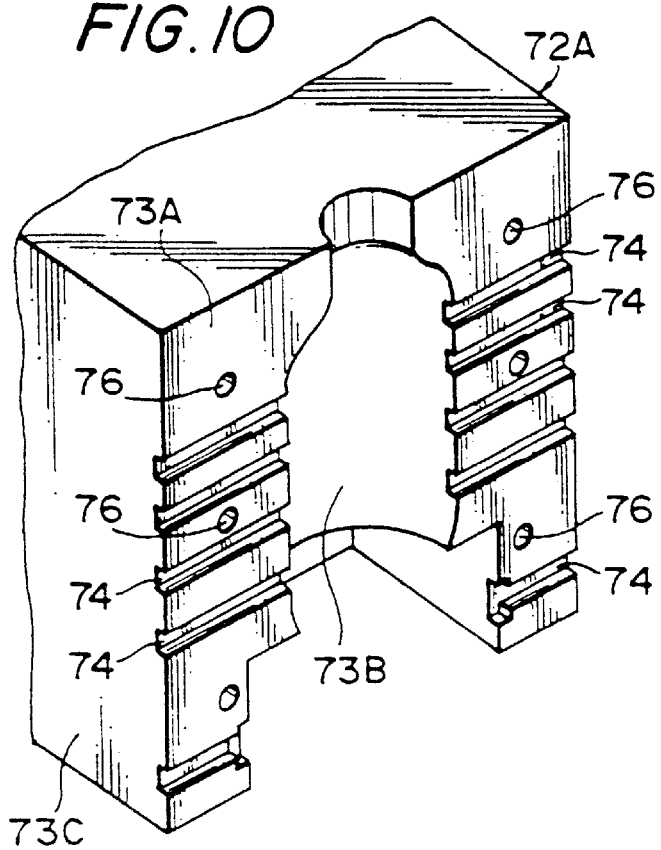
FIG. 10 is a fragmentary perspective view showing a blow cavity mold to be used in the step of biaxial stretch blow molding the inner bottle.

(5) The structure of a blow cavity mold 72 to be used in the step of biaxial stretch blow molding the inside preform 70 is shown in FIG. 10.

The blow cavity mold 72 is composed of two mold halves 72A and a bottom mold 72B. Air expulsion grooves 74 are formed in a so-called parting surface 73A of the mold half 72A, extending from a cavity surface 73B to an outside wall surface 73C. These air expulsion grooves 74 can be aligned with the circumferential concave ribs 22 formed in the body portion of the outer bottle 12. Therefore, the air expulsion grooves 74 can communicate with the air vent holes 24 formed in the circumferential concave ribs 22. The blow cavity mold 72 is also provided with coolant passageways 76 for circulating a coolant in a number of places. This will assist in cooling the outer bottle 12 in contact with the cavity surface 73B.

The outer bottle 12 that has been naturally cooled in the atmosphere is placed on the bottom mold 72B of the blow cavity mold 72. The circumferential concave ribs 22 molded in the body portion of the outer bottle 12 are therefore aligned with the air expulsion grooves 74 of the blow cavity mold 72. Then the inside preform 70 is inserted into the outer bottle 12 on the bottom mold 72B from the opening of the outer bottle 12. At that time, as shown in FIG. 4, the second flange 14B of the inside preform 70 is superposed on the first flange 12B of the outer bottle 12, and the engaging pin 14B1 on the second flange 14B is fitted into the engaging hole 12B1 into the first flange 12B so that the inner bottle 14 is prevented from rotating with respect to the outer bottle 12. Alternatively, the engaging pin 14B1 may be replaced by a key. In this step, since the outer bottle 12 is set on the bottom mold 72B of the blow cavity mold 72, it is unnecessary to hold the lip portion of the outer bottle 12. It is therefore possible to avoid any interference when the inside preform is inserted.

Figure 9:
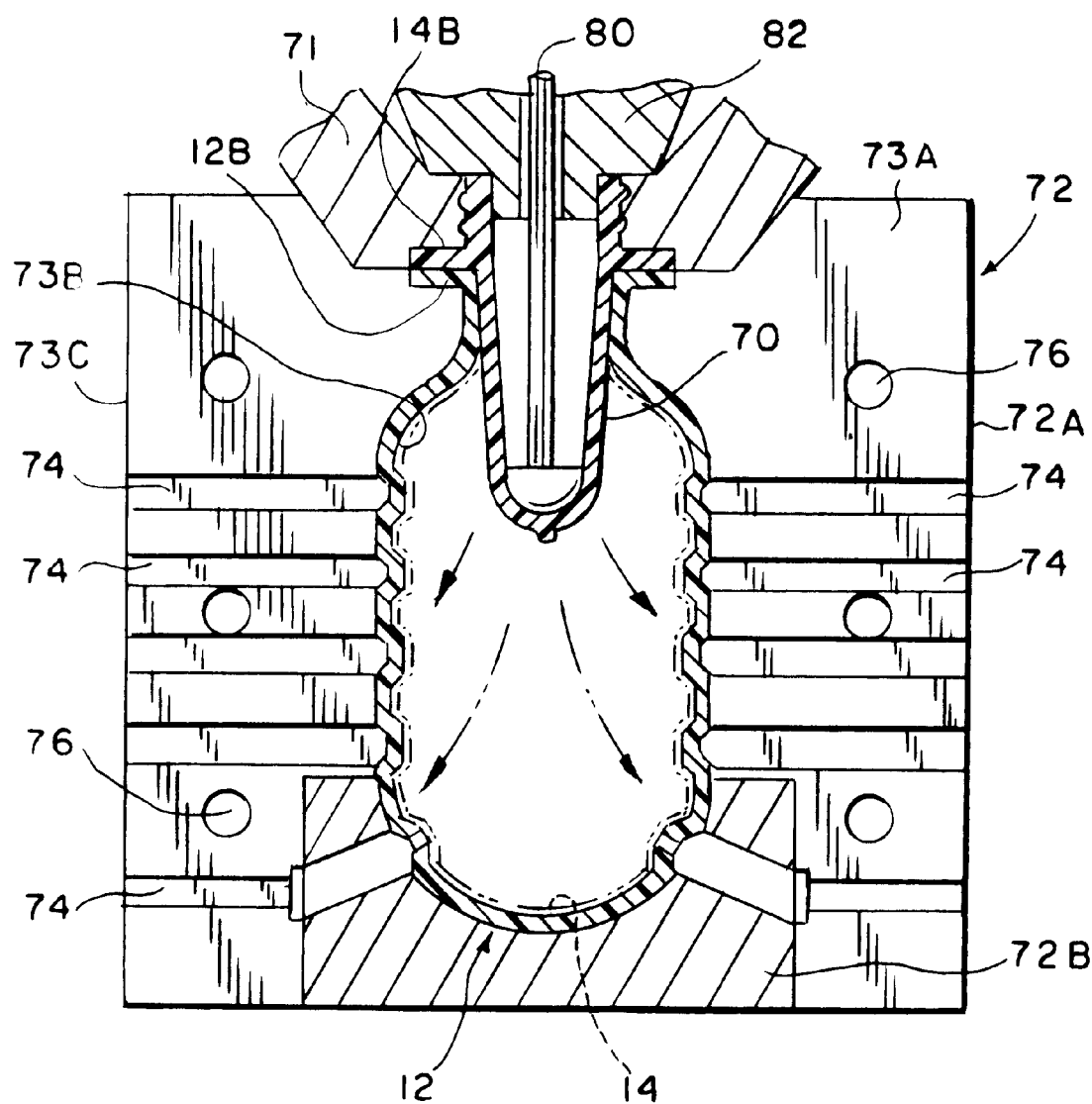
FIG. 9 is a schematic sectional view of a double-wall bottle of this invention, which shows the step of biaxial stretch blow molding the inner bottle.
Figure 11:
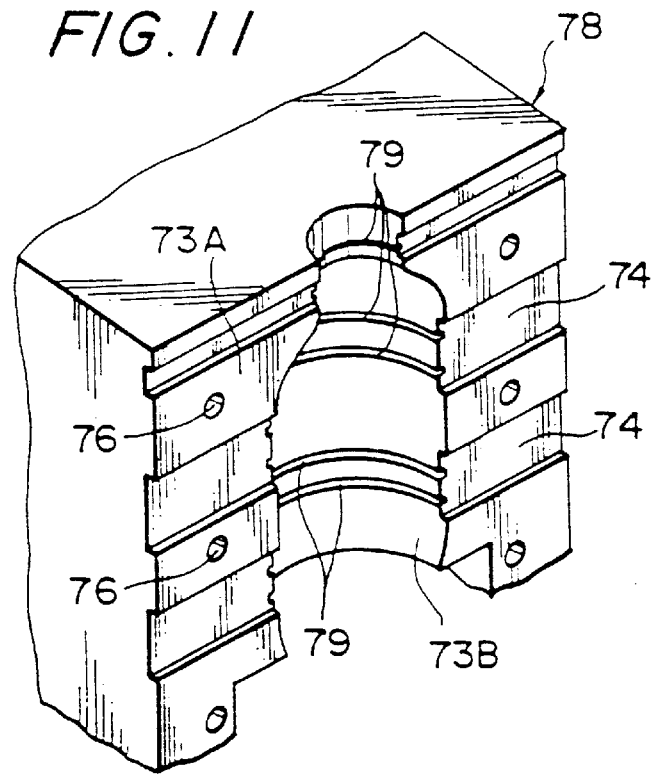
FIG. 11 is a fragmentary perspective view showing a modification of the blow cavity mold of FIG. 9.

FIG. 11 shows, as an illustrative example, an alternative air expulsion structure of a blow cavity mold 78 which allows the outer bottle 12 to be devoid of circumferential ribs; the same reference numbers as those of FIG. 9 designate the same parts.

The blow cavity mold 78 to be used for this air expulsion structure is composed of similar mold halves as those of FIG. 9, and parting surface 73A of the blow cavity mold 78 has air expulsion grooves 74 extending from the cavity surface 73B to the outside wall surface 73C.

In the cavity surface 73B there are circumferential grooves 79, which communicate with the air expulsion grooves 74, at positions spaced in the longitudinal axial direction the circumferential grooves 79 being adapted to be aligned with the air vent holes 24 of the outer bottle 12. Each of the air expulsion grooves 74 may, for example, communicate with the circumferential grooves 79 at one or more positions spaced in the longitudinal axial direction.

The outer bottle 12 naturally cooled in the atmosphere is placed on the bottom mold 72B (FIG. 8A) of this blow cavity mold 78.

It is possible to ensure air expulsion passageways for this outer bottle 12 by setting the outer bottle 12 so as to alien the air vent holes 24 with the circumferential grooves 79 in the cavity surface 73B, even if there are no circumferential concave ribs 22 on the body portion.

The width and depth of each circumferential groove 79 should be such that the pressure imposed during biaxial stretch blow molding does not cause the body portion of the outer bottle 12 to penetrate into the circumferential groove 79.

(6) In this step, as shown in FIG. 9, before the biaxial stretch blow molding, the two mold halves 72A confronting the body portion of the outer bottle 12 are clamped with respect to the outer bottle 12 placed on the bottom mold 72B. The inside preform 70 is then expanded in the longitudinal axial direction by an stretching rod 80 and in the transverse axial direction by the blowing of air from a blow core mold 82. As the inside preform 70 expands progressively from the lip toward the bottom, the air remaining inside the outer bottle 12 will be expelled via the air vent holes 24 formed in the outer bottle 12.

At this time, since a plurality of air vent holes 24 are formed in the body portion along the longitudinal axial direction of the outer bottle 12, the air can be expelled smoothly through at least some of the air vent holes 24 and the expansion of the inside preform 70 is thus not locally impeded. Note that, these air vent holes 24 need not be formed in a single line along the longitudinal axis, provided they are formed at different positions in the longitudinal axial direction of the outer bottle 12. Note also that it is preferable to form the air vent holes 24 at different positions in the circumferential direction of the outer bottle 12, from the point of view of facilitating the smooth expulsion of air. The air expelled from the air vent holes 24 is directed to the air expulsion grooves 74 of the blow cavity mold 72 through the circumferential concave ribs 22 and then is exhausted out of the blow cavity mold 72. Thus, since expulsion in the direction in which the inside preform is to be expanded can be performed reliably, it is possible to prevent the expansion resistance of the preform from increasing, thus preventing the wall thickness distribution from deteriorating. Even if the air vent holes 24 of the outer bottle 12 are not aligned with the air expulsion grooves 74 of the blow cavity mold 72, it is possible to direct the air which is expelled via the air passageways 26 formed by the gaps between the circumferential concave ribs 22 and the cavity surface 73, as shown in FIG. 2, to the air expulsion grooves 74. As a result, smooth expulsion can be achieved over the entire area of the inner bottle 14.

Since it can be expanded without external pressure, the inside preform 70 comes into intimate contact with the inner wall surface of the outer bottle 12. The inside preform 70 in contact with the inner wall surface of the outer bottle 12 will then be molded into a shape corresponding to the contours of the inner bottle 14, at which time the inner wall surface of the outer bottle 12 serves as a cavity surface. Since the inner bottle 14 in contact with the inner wall surface of the outer bottle 12 will also be cooled by the outer bottle 12, as shown in FIG. 9, the inner bottle 14 can harden instantaneously and hence the shaping of the inner bottle can be facilitated. The inner bottle 14 can also be brought into intimate contact with the inner wall surface of the outer bottle 12, without fusing with the outer bottle 12.

Figure 12:
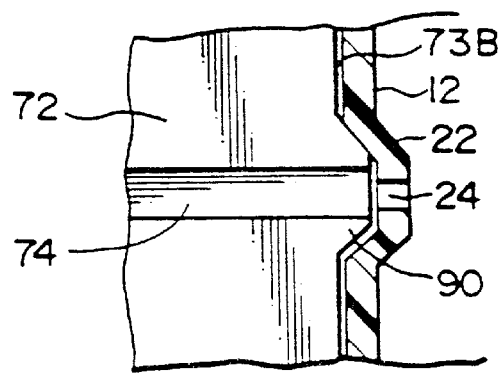
FIGS. 12 to 14 are schematic sectional views, each showing positional relationships between a cavity surface of a blow cavity mold and circumferential ribs and air vent holes formed in an outer bottle.

An example of a variation of the cavity surface 73B of the blow cavity mold 72 is shown in FIG. 12. Circumferential convex ribs 90 that can mate with the indentations of the circumferential concave ribs 22 are formed in the cavity surface 73B of the blow cavity mold 72 at positions corresponding to the circumferential concave ribs 22 of the outer bottle 12. Experiments performed by the inventor of this invention have verified that, when the inner bottle 14 is blow-molded within the outer bottle 12, the outer bottle 12 is pulled toward the bottom portion during the expansion process of the inner bottle 14, and wrinkles occur close to the bottom portion. In this case, the mating shown in FIG. 12 between the circumferential concave ribs 22 of the outer bottle 12 and the circumferential convex ribs 90 protruding from the cavity surface 73B ensures that deformation of the outer bottle 12 is prevented. In this case, the shape of the cavity surface 73B of the blow cavity mold 72 can be made to be the same as that of the cavity surface of the blow cavity mold 52. Since the outer bottle 12 is constricted during the blow-molding of the inner bottle 14, gaps can be ensured between the circumferential concave ribs 22 of the outer bottle 12 and the circumferential convex ribs 90 protruding from the cavity surface 73B. By being forced through these gaps, the air within the outer bottle 12 can be led out of the blow cavity mold 72 via the air expulsion grooves 74.

Figure 13:
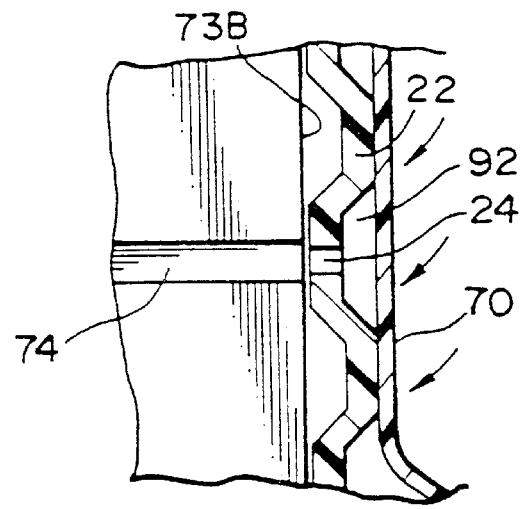

A variation on the positioning of the air vent holes 24 formed in the outer bottle 12 is shown in FIG. 13. In thus embodiment the air vent holes 24 are not formed within the region of the circumferential concave ribs 22; they are formed in a region sandwiched between upper and lower circumferential concave ribs 22. In this embodiment, if the upper and lower circumferential concave ribs 22 are arranged comparatively closely, the advantages listed below are obtained. That is, in this case, the inside preform 70 of the expansion process is in intimate contact with the inner wall at the upper and lower circumferential concave ribs 22, as shown in FIG. 13. Therefore, since the air vent holes 24 open into a region 92 bounded by the upper and lower circumferential concave ribs 22 and the inside preform 70, it is possible to lead the air within that region 92 out to the exterior of the blow cavity mold 72. As a result, it is possible to reduce molding faults caused by trapped air.

Figure 14:
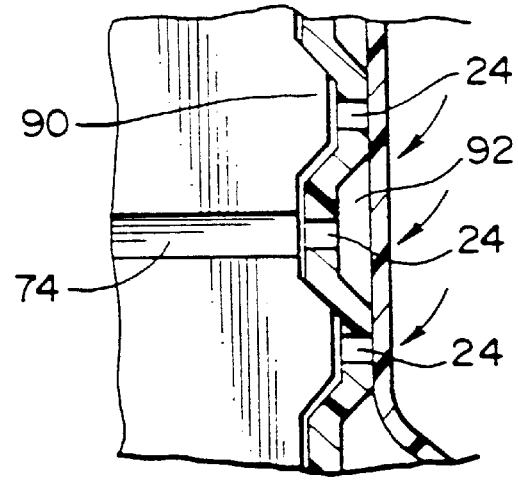

An embodiment combining the embodiments of FIG. 12 and FIG. 13 is shown in FIG. 14. Use of this embodiment makes it possible to prevent the formation of wrinkles in the outer bottle 12 during the blow molding of the inner bottle 14, and allow the air within the region 92 to be expelled smoothly. Note that if a large number of air vent holes 24 is to be formed in the body portion of the outer bottle 12, they can be provided in both the molding region of the circumferential concave ribs 22 and outside that region, as shown in FIG. 13.

Figure 15:
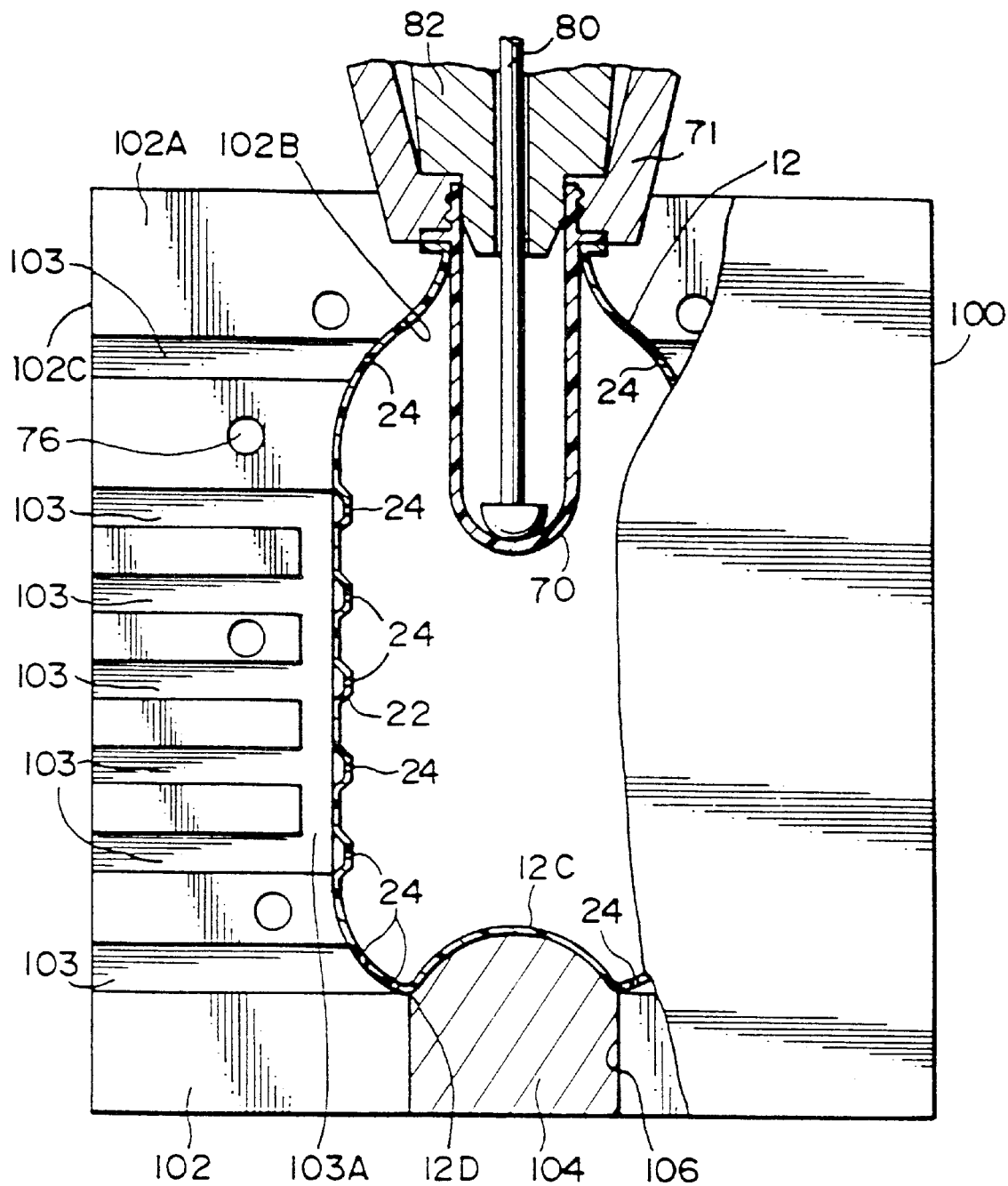
FIG. 15 is a schematic sectional view showing the process of biaxial stretch blow molding an inner bottle.

Yet another embodiment of this invention is shown in FIG. 15. In this figure, components that have the same functions as those in FIG. 9 are given the same reference numbers and detailed descriptions thereof are omitted below. With this embodiment, an upwardly domed bottom 12C is provided in the bottom portion of the outer bottle 12 so as to form a protrusion extending inward. For this purpose, a blow cavity mold 100 therefore is configured of two mold halves 102 (only one is shown in the figure) and a bottom mold 104 for forming the domed bottom. A parting surface 102A of the mold half 102 has a plurality of air expulsion grooves 103 communicating from a cavity surface 102B thereof to an outer surface 102C, in a similar manner to that shown in FIG. 9. With this embodiment, the plurality of air expulsion grooves 103, on the side facing the parting surface 102A of the mold half 102, forms a longitudinal groove 103A provided so as to extend over the region in which the plurality of air vent holes 24 are provided in the longitudinal axial direction of the body portion of the outer bottle.

Figure 16:
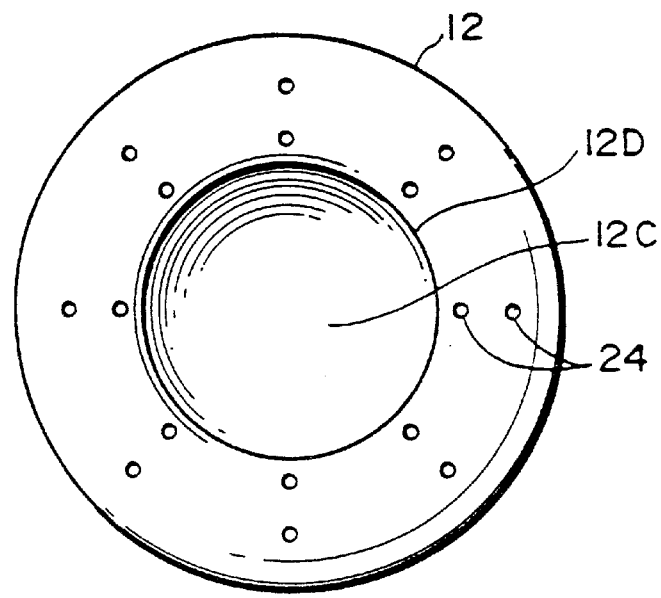
FIG. 16 is a bottom view showing the outer bottle of FIG. 15.

A large number of air vent holes 24 are also formed in the bottom portion of the outer bottle 12, as shown in FIG. 16. Two characteristics are obtained by having such air vent holes 24 in the bottom portion of the outer bottle 12 can be cited.

One characteristic is that the air vent holes 24 of the bottom portion are provided in the vicinity of a narrow ridged base portion 12D around the domed bottom 12C. The reason for this is described below. In general, if the bottom portion of a bottle has a domed bottom shape, a narrow ridged base portion 12D is inevitably formed corresponding to a parting surface 106 between the mold halves 102 and the bottom mold 104 of the blow cavity mold 100. There is a slight gap at this parting surface 106. Therefore, if air vent holes 24 are formed in the vicinity of the narrow ridged base portion 12D, it is possible to allow air to escape through the air vent holes 24 and the gap over the parting surface 106. The air vent holes 24 could be formed in the base portion 12D itself. However, from considerations of the stability of the bottle, it is preferable that the air vent holes 24 are formed at a position away from the base portion.

The other characteristic is that the opening ratio of the air vent holes 24 per unit area is set to be larger in the bottom portion than in the body portion of the outer bottle. The opening ratio is defined as $$n \times h / S.$$

where "h" is the opening area of one hole 24, N is the number of holes in a unit area, and S is the unit area. As shown in FIG. 16, for example, eight air vent holes 24 are formed in each of two concentric circles on the outer side of the narrow ridged base portion 12D of the bottom portion, to give a total of 16 such holes. In contrast with the bottom portion where these 16 air vent holes 24 are concentrated in a comparatively cramped predetermined area, the number of air vent holes 24 provided in the same predetermined area of the body portion is less than that in the bottom portion. With the embodiment shown in FIG. 15 and FIG. 16, the opening areas of the air vent holes 24 in the body portion and bottom portion of the outer bottle 12 are the same, but their respective numbers are different, but the same result could be obtained by making the numbers but the area of the air vent holes 24 in the bottom portion bigger.

The reasons for setting the positions and opening ratios of the air vent holes in the bottom portion as described above will now be considered below. During the step of biaxial stretch blow molding the inner bottle 14, the preform 70 for the inner bottle arrives at the cavity surface 102B of the blow cavity mold 100 from above. In the final stages of this expansion process, the bottom portion of the inside preform 70 comes into contact with the top of the bottom mold 104, until it finally reaches the cavity surface in the vicinity of the narrow ridged base portion 12D. In other words, air is highly likely to become trapped in the bottom portion of the outer bottle 12, particularly in the vicinity of the base portion 12D. With this embodiment, air vent holes 24 are formed where air is likely to become trapped, so the likelihood of air becoming trapped in the outer bottle 12 is reduced. If this likelihood of air-trapping is removed, the inner bottle 14 can come into intimate contact with the outer bottle 12, even at the bottom portion thereof, so that the quality of the double-wall bottle 10 can be improved and thus the effective volume within the inner bottle 14 that can contain the syrup can be increased. By increasing the opening ratio of the air vent holes 24 in the bottom portion end of the outer bottle 12, it becomes possible to smoothly implement the operation of expelling air during the final stages of the biaxial stretch blow molding of the inner bottle 14. Note that air expulsion grooves could also be formed in the parting surface 106. Additionally, air vent holes can be formed in the bottom mold 104, so that air vent passageway can be formed other than in the parting surface 106.

Figure 17:
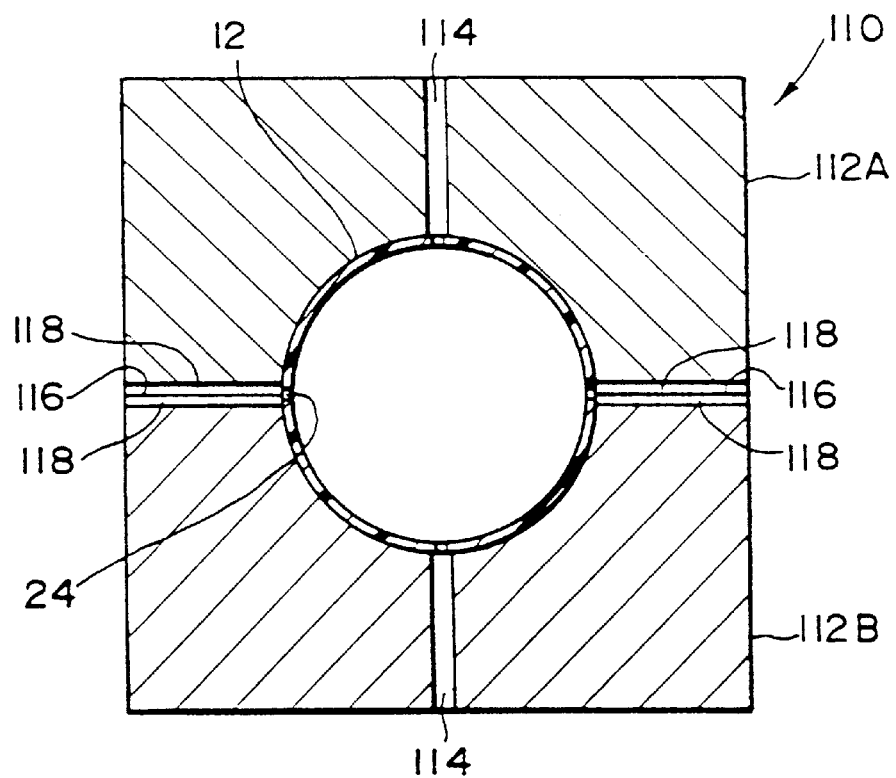
FIG. 17 is a schematic sectional view showing a blow cavity mold having air vent holes.

The above embodiment implements air expulsion by using the parting surface of the split molds or the bottom mold but it should be obvious to those skilled in the art that this invention is not limited to this air expulsion method. In a still further embodiment shown in FIG. 17, air vent holes 114 are formed in each of two split molds 112A and 112B that configure a blow cavity mold 110. Air expulsion grooves 118 are formed in a parting surface 116. In this case, the air vent holes 114 and air expulsion grooves 118 of the split molds 112A and 112B open at positions that correspond with the air vent holes 24 formed in the outer bottle 12. In other words, when the outer bottle 12 is inserted into the blow cavity mold 110, it is necessary to position the outer bottle 12 in such a manner that the air vent holes 24 around the circumference thereof are aligned with the air vent holes 114 in the split molds 112A and 112B.

Figure 18:
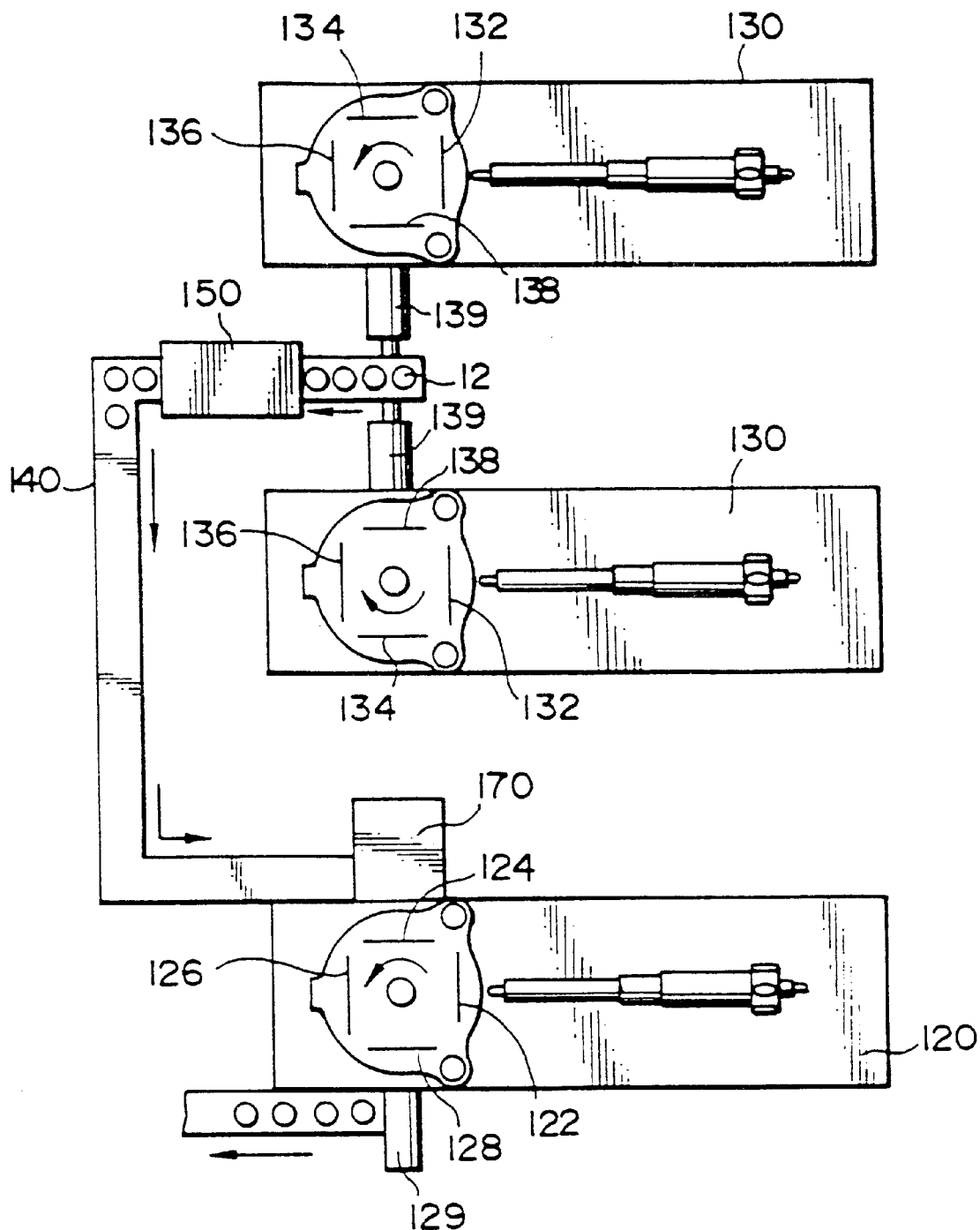
FIG. 18 is a plan view showing the entire structure of a double-wall bottle molding apparatus.

A plan view of a blow molding apparatus that is suitable for implementing the method of this invention is shown in FIG. 18. As shown in this figure, the apparatus in accordance with this embodiment is provided with a plurality (such as two) of first blow molding apparatuses 130 for molding outer bottles 12, for second first blow molding apparatus 120 for molding inner bottles 14. From the two first blow molding apparatuses 130 is provided a conveyor path 140 for supplying and conveying outer bottles 12 to the second blow molding apparatus 120.

The first and second blow molding apparatuses 130, 120 are installations that are known in the art, such as four-station blow molding apparatuses. An injection molding station 122 in the second blow molding apparatus 120 injects and molds preforms 70. A temperature conditioning station 124 adjusts the temperature of each injection molded preform 70 to a temperature suitable for expansion. A blow molding station 126 blow-molds an inner bottle 14 out of the preform 70, within the outer bottle 12, to form a double-wall bottle. An ejection station 128 ejects the completed double-wall bottle 10 from a lip mold. This double-all bottle 10 is conveyed out of the second blow molding apparatus 120 by an ejector 129.

Similarly, each of the two first blow molding apparatuses 130 has an injection station 132, a temperature conditioning station 134, a blow molding station 136, and an ejection station 138. Each outer bottle 12 ejected by the ejection station 138 is transferred to the conveyor path 140 by an ejector 139. The outer bottles 12 from the two first blow molding apparatuses 130 are conveyed in series along the conveyor path 140. During this time, the stations of the first blow molding apparatuses 130 could be arranged such that the ejection stations 138 of the first blow molding apparatuses 130 are opposite one another. This is because the single conveyor path 140 can be used in common by the two first blow molding apparatuses 130. Partway along the conveyor path 140 is provided a hole-piercing mechanism 150 that forms the air vent holes 24 in outer bottles.

Figure 19:
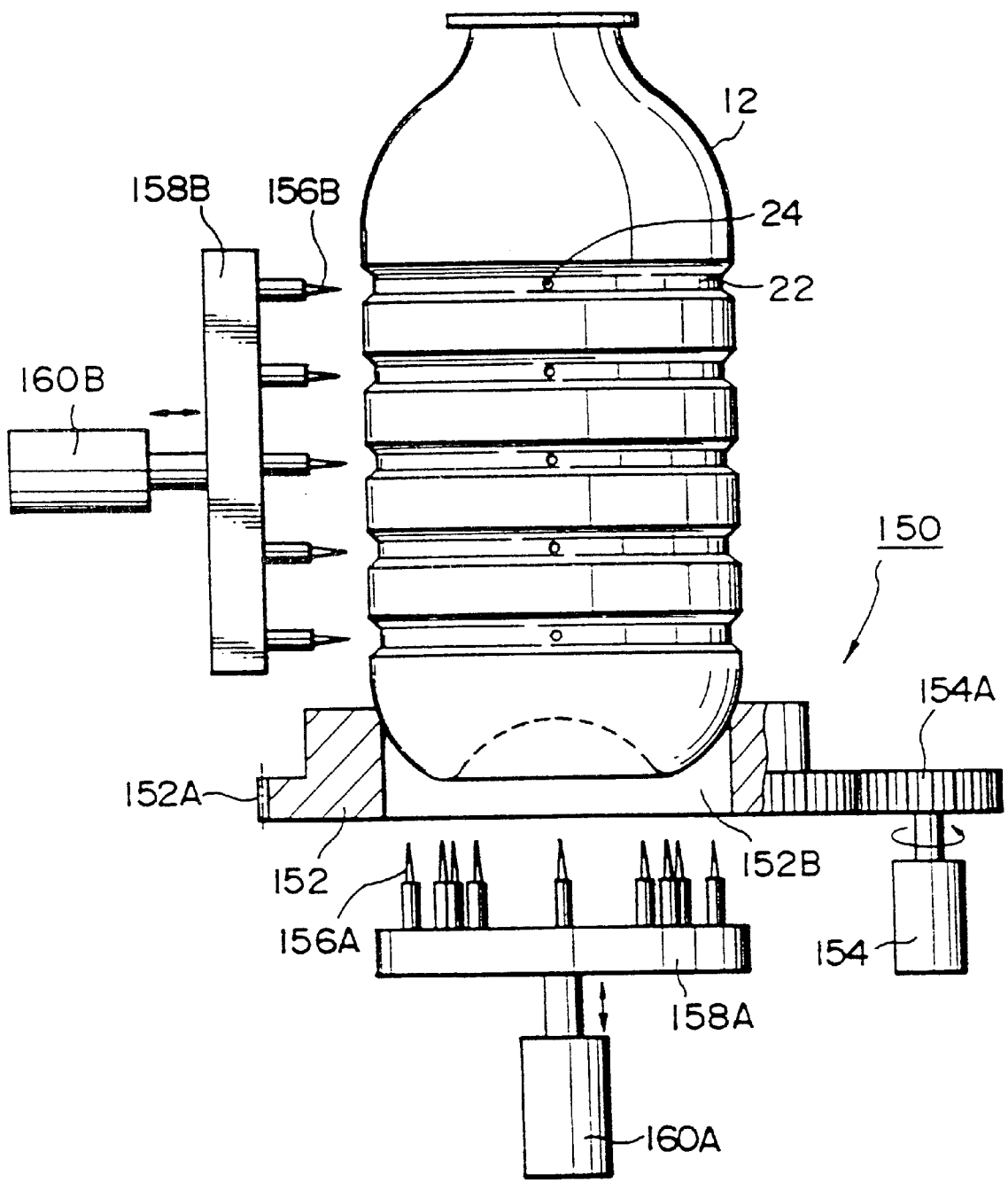
FIG. 19 is a schematic illustrative view of a hole-piercing mechanism.

One embodiment of the hole-piercing mechanism 150 will now be described with reference to FIG. 19. As shown in this figure, the hole-piercing mechanism 150 has a turntable 152 on which an outer bottle 12 is placed to rotate. The turntable 152 has a gear 152A at its peripheral edge. This gear 152A meshes with a gear 154A that is fixed to an output shaft of a motor 154, to impart a rotational force to the turntable 152. The turntable 152 is also provided with an opening 152B.

A plurality of needles 156A for forming air vent holes 24 in the bottom portion of the outer bottle 12 is arranged below the turntable 152. These needles 156A are fixed to a movable plate 158A that is raised and lowered by an air cylinder 160A. Similarly, a plurality of needles 156B are arranged to the side of the outer bottle 12 in order to form air vent holes 24 in the body portion of the outer bottle 12. These needles 156B are fixed to a movable plate 158B that is raised and lowered by an air cylinder 160B.

When it comes to forming the air vent holes 24 in the bottom portion and body portion of the outer bottle 12 mounted on the turntable 152, first the air cylinder 160A operates. This raises and lowers the needles 156A through openings 152b in the turntable 152, to form a plurality of air vent holes 24 in the bottom portion of the outer bottle 12. During this time, the outer bottle 12 could be held by, for example, a lip portion thereof, in order to prevent the outer bottle from retreating upward. After the needles 156A have been driven downward, the air cylinder 160B is driven to make the needles 156B form a line of a plurality of air vent holes 24 along the longitudinal axial direction of the body portion of the outer bottle 12. After these needles 156B have been driven backwards, the turntable 152 is intermittently rotated through a required angle. By driving the needles 156B forward and backward at positions where this rotation stops, in the same way as described above, it is possible to form a plurality of air vent holes 24 arranged in both the circumferential and longitudinal axial directions in the body portion of the outer bottle 12. Note that if the needles 156A and 156B are heated, as described above with reference to a previous embodiment, the hole-piercing can be performed smoothly.

Each of the outer bottles in which air vent holes 24 have been formed while being conveyed along the conveyor path 140, and a inside preform 70 that has been heated to a suitable temperature by the temperature conditioning station 124 of the second blow molding apparatus 120 is inserted by an inserter 170 so that the outer bottle surrounds the preform. During this time, the inside preform 70 and the outer bottle 12 could have a configuration such that the outer bottle 12 is prevented from falling off the inside preform 70. The reason why the preform is inserted into the outer bottle 12 at the temperature conditioning station 124 is because sufficient space can be reserved for the insertion by lowering a temperature conditioning pot.

The reason why two first blow molding apparatuses 130 are connected to one second molding apparatus 120 is described below. As stated above, the outside preforms 50 formed by injection molding in the first blow molding apparatuses 130 have thicker walls than the inside preforms 70. Therefore, the injection molding cycle of each first blow molding apparatus 130 for injection molding the thicker outside preforms 50 is longer than that of the second blow molding apparatus 120. In general, the station that requires the longest processing time in a four-station blow molding apparatus is the injection molding station, and this processing time usually determines the molding cycle time of the molding apparatus. Therefore, the molding cycle time of the second blow molding apparatus 120 is shorter than that of the first blow molding apparatuses 130. This means that, if outer bottles are not supplied from a plurality of first blow molding apparatuses 130, the outer bottles 12 can no longer be supplied at a timing that matches the blow-molding of the inner bottles 14 in the second blow molding apparatus 120.

In this way, a continuous supply of double-wall bottles 10 can be molded if a number M (M>N) of first blow molding apparatuses 130 are provided for a number N (where N≧1) of second blow molding apparatuses 120, in accordance with the difference in cycle time between the first and second blow molding apparatuses 130 and 120. If the cycle times of the first and second blow molding apparatuses 130 and 120 are substantially the same, one each of the first and second blow molding apparatuses 130 and 120 could be connected together.

Incidentally, embodiments of the present invention do not have to be the type which have inter-connection between the outer bottle molding machine and the inner bottle molding machine. In other words, embodiments of the present invention can be made by conveying outer bottles, made and stocked beforehand, to the site where there is a inner bottle molding machine to mold an inner bottle with the inserted outer bottle.

Note that this invention is not limited to the embodiments described above; a variety of different embodiments thereof can be conceived within the scope of the present invention. For example, the contents sucked out of the double-wall bottle 10 by reduced pressure are not limited to syrups, they could be any liquid that can be sucked out by such reduced pressure.

Note also that the shape of the air vent holes 24 formed in the outer bottle 12 is not limited to a circular hole; the air vent holes 24 could be any other shape, such as triangular, square, polygonal, or oval. In such a case, members corresponding to the shape of the holes to be formed can be used.

As described above, according to the double-wall bottle of this invention, it is possible to ensure sufficient transparency and deforming strength. Since the inner bottle is expanded in a desired manner during the biaxial stretch blow molding, it is possible to optimize the wall thickness distribution so that a wall thickness that can maintain sufficient flexibility can be obtained.

According to the double-wall bottle molding method of this invention, since it is possible to expel the air which remains inside the outer bottle reliably when the inner bottle is molded by biaxial stretch blow molding, it is possible to expand the inner bottle smoothly so that the shaping of the inner bottle can be facilitated. Since the inner bottle is in contact with the outer bottle, it is possible to facilitate the cooling of the inner bottle by cooling only the outer bottle.

Further, since it is possible to prevent the outer and inner bottles from fusing with each other by cooling the outer bottle in the blow mold for a predetermined period of time and thus cooling the inner bottle via the outer bottle, it is possible for the inner bottle to separate smoothly from the outer bottle so that the deformation of the inner bottle by pressure reduction can be carried out easily and reliably. If the outer bottle is molded with the circumferential ribs serving as the air passageways, it is reinforced by the circumferential ribs and hence does not deform, even when the inner bottle is deformed by pressure reduction. These circumferential concave ribs also prevent deformation of the bottle when it is gripped.

I claim:

1. A method of molding a double-wall bottle, comprising the steps of:
    biaxial stretch blow molding a first preform to form an outer bottle having body and bottom portions;
    forming air vent holes in the bottom portion and the body portion of said outer bottle;
    setting a second preform and said outer bottle into a first blow cavity mold, said second preform being placed inside of said outer bottle after having formed said outer bottle, said second preform having a body portion of an outer diameter smaller than the diameter of an opening of said first preform and having a bottom portion, the body portion of the outer bottle having a longitudinal direction and a circumferential direction; and
    biaxial stretch blow molding said second preform to form an inner bottle within said outer bottle;
    wherein said step of forming said air vent holes is prior to said step of biaxial blow molding said second preform and includes a step of forming air vent holes at different positions in the longitudinal and circumferential directions of said body portion of said outer bottle in a predetermined pattern for enabling venting through said holes during said step of blow molding said second preform into said inner bottle;
    wherein, during said step of biaxial stretch blow molding said inner bottle, the air within said outer bottle is vented by expelling air via said air vent holes formed at said body and bottom portions of said outer bottle; and
    wherein the step of biaxial stretch blow molding said second preform takes place inside a blow mold, said blow mold having means for venting the air from said air vent holes including said air vent holes formed in said predetermined pattern, and said step of expelling includes a step for using the means for venting to expel air from the air vent holes including the air vent holes formed in the predetermined pattern.

2. A double-wall bottle molding method according to claim 1, wherein:
    said means for venting in said first blow mold comprises configuring said first blow cavity mold as a plurality of split molds than can freely open and close with respect to each other;
    at least one of said split molds has an air expulsion groove communicating from a cavity surface of said split mold to an outer surface thereof, formed in a parting surface of said split mold; and
    during said step of expelling, the air expelled from within said outer bottle via said air vent holes is exhausted out of said first blow cavity mold via said air expulsion groove.

3. A double-wall bottle molding method according to claim 2, wherein:
    during said step of biaxial stretch blow molding said outer bottle, a plurality of circumferential concave ribs are formed at a plurality of positions along the longitudinal axial direction of said outer bottle, in such a manner as to extend around the entire circumference of said outer bottle and be indented toward the interior of said outer bottle;
    during said step of forming air vent holes in said predetermined pattern, at least one of said air vent holes is formed within the region in which said circumferential concave ribs are formed in said outer bottle;
    during said setting step, part of said circumferential concave rib of said outer bottle is arranged to correspond to said air expulsion groove in said split mold; and
    during said step of expelling during said step of biaxial stretch blow molding said inner bottle, air is exhausted via gaps between said cavity surface of said first blow cavity mold and said circumferential concave ribs.

4. A double-wall bottle molding method according to claim 3, wherein:
    circumferential convex ribs are formed in the cavity surface of said first blow cavity mold at positions corresponding to said circumferential concave ribs of said outer bottle; and
    during said step of biaxial stretch blow molding said inner bottle, a mating between said circumferential concave ribs and- said circumferential convex ribs prevents deformation of said outer bottle.

5. A double-wall bottle molding method according to claim 2, wherein:
    during said step of biaxial stretch blow molding said outer bottle, circumferential concave ribs are formed at a plurality of positions along the longitudinal axial direction of said outer bottle, in such a manner as to extend around the entire circumference of said outer bottle and be indented toward the interior of said outer bottle; and
    during said step of forming said air vent holes, at least one of said air vent holes is formed outside of the
    region in which said circumferential concave ribs are formed in said outer bottle.

6. A double-wall bottle molding method according to claim 5, wherein:
    circumferential convex ribs are formed in the cavity surface of said first blow cavity mold at positions corresponding to said circumferential concave ribs of said outer bottle; and
    during said step of biaxial stretch blow molding said inner bottle, a mating between said circumferential concave ribs and said circumferential convex ribs prevents deformation of said outer bottle.

7. A double-wall bottle molding method according to claim 2, wherein:
    said split mold is formed in such a manner that said means for venting comprises air expulsion grooves that communicate from a cavity surface thereof to an outer wall and are formed in a parting surface of said split mold, and also a circumferential groove that communicates with said air expulsion grooves is formed in said cavity surface; and
    during said setting step, said air vent holes of said outer bottle are positioned to correspond to said circumferential groove.

8. A double-wall bottle molding method according to claim 2, wherein:
    coolant passageways are formed in said split mold, and said inner bottle molded within said outer bottle by biaxial stretch blow molding is cooled by said split mold via said outer bottle.

9. A double-wall bottle molding method according to claim 1, wherein:
said first blow cavity mold is configured of a plurality of split molds that can freely open and close with respect to each other;
said means for venting comprises air vent holes formed in each of said split molds in a pattern corresponding to said predetermined pattern for communicating from a cavity surface thereof to an outer surface; and
during said setting step, said air vent holes of said outer bottle are positioned to correspond with said air vent holes in said split molds.

10. A double-wall bottle molding method according to claim 9, wherein:
coolant passageways are formed in said split mold and said inner bottle that is molded within said outer bottle by biaxial stretch blow molding is cooled by said split mold via said outer bottle.

11. A double-wall bottle molding method according to claim 1, wherein:
said first blow cavity mold is configured of a plurality of split molds including a bottom mold;
said step of forming said air vent holes includes a step of forming at least some of said air vent holes in a bottom portion of said outer bottle, substantially corresponding to a parting surface of said bottom mold; and
during said step of expelling and venting during said step of biaxial stretch blow molding said inner bottle, air expelled via said air vent holes formed in said bottom portion of said outer bottle is exhausted via gaps on said parting surface of said bottom mold.

12. A double-wall bottle molding method according to claim 1, wherein:
during said step of forming said air vent hole, heated hole-piercing members are driven forward and backward relative to said outer bottle to form said air vent hole.

13. A double-wall bottle molding method according to claim 1, wherein:
said step of forming said air vent holes are implemented within a second blow cavity mold used during said biaxial stretch blow molding of said first preform into said outer bottle, and said air vent holes are formed by hole-piercing members protruding from a cavity surface of said second blow cavity mold.

14. A double-wall bottle molding method according to claim 1, wherein:
said step of forming said air vent holes is implemented by driving heated hole-piercing members forward and backward relative to said outer bottle, after said outer bottle has been removed from a second blow cavity mold used during said biaxial stretch blow molding of said first preform into said outer bottle.

15. A double-wall bottle molding method according to claim 14, wherein:
said step of forming said air vent holes is implemented by rotating said outer bottle intermittently, driving said heated hole-piercing members forward and backward relative to said outer bottle when said rotation is stopped, whereby said air vent holes are formed at a plurality of locations around the circumferential direction of said outer bottle.

16. A double-wall bottle molding method according to claim 1, further comprising the steps of:
adjusting the temperature of said second preform to a suitable temperature for expansion, before said step of setting said second preform in said first blow cavity mold; and inserting said outer bottle in such a manner that said outer bottle surrounds said second preform, after said temperature adjustment step;
wherein:
during said setting step, said second preform and said outer bottle are set simultaneously in said first blow cavity mold.

17. A double-wall bottle molding method according to claim 1, wherein:
said first blow cavity mold is configured of a plurality of split molds including a bottom mold, and said step of setting in said first blow cavity mold includes a step of mounting said outer bottle on said bottom mold.

18. A double-wall bottle molding method according to claim 1, further comprising a step of forming said first and second preforms of the same material and next to each other.

19. A double-wall bottle molding method according to claim 1, wherein during said steps of venting and expelling, air is vented from said air holes in said bottom portion at a faster rate than air is vented from said air vent holes in said body portion.

20. A double-wall bottle molding method according to claim 1, wherein the steps of biaxial stretch blow molding the inner bottle and expelling air are performed substantially instantaneously.

21. A method of molding a double-wall bottle, comprising the steps of:
biaxial stretch blow molding a first preform to form an outer bottle having body and bottom portions;
forming air vent holes in the bottom portion of said outer bottle:
setting a second preform and said outer bottle into a first blow cavity mold, said second preform being placed inside of said outer bottle, said second preform having a body portion of an outer diameter smaller than the diameter of an opening of said first preform and having a bottom portion, the body portion of the outer bottle having a longitudinal direction and a circumferential direction; and
biaxial stretch blow molding said second preform to form an inner bottle within said outer bottle;
wherein said step of forming said air vent holes includes a step of forming said air vent holes at different positions in the longitudinal and circumferential directions of said body portion of said outer bottle;
wherein said first blow cavity mold is configured of a plurality of split molds that can freely open and close with respect to each other;
wherein at least one of said split molds has an air expulsion groove communicating from a cavity surface of said split mold to an outer surface thereof, formed in a parting surface of said split mold;
wherein said air expulsion groove of said split mold is formed such that the shape thereof on the side facing said cavity surface is of a longitudinally extended groove extending over the length of the region in which said air vent holes are formed along the longitudinal direction of said outer bottle; and
wherein during said step of biaxial stretch blow molding said inner bottle, the air within said outer bottle is expelled via said air vent holes formed at said body and bottom portions of said outer bottle and is exhausted to the outside of said mold via said longitudinally extended groove shared by said air vent holes.

22. A method of molding a double-wall bottle, comprising the steps of:
biaxial stretch blow molding a first preform to form an outer bottle having body and bottom portions;

forming air vent holes in the bottom portion of said outer bottle;

setting a second preform and said outer bottle into a first blow cavity mold, said second preform being placed inside of said outer bottle, said second preform having a body portion of an outer diameter smaller than the diameter of an opening of said first preform and having a bottom portion, the body portion of the outer bottle having a longitudinal direction and a circumferential direction;

biaxial stretch blow molding said second preform to form an inner bottle within said outer bottle;

wherein said step of forming said air vent holes includes a step of forming said air vent holes at different positions in the longitudinal and circumferential directions of said body portion of said outer bottle, the number and/or total opening area of said air vent holes formed in said bottom portion and body portion is set to be such that an opening ratio per unit area of said bottom portion is larger than an opening ratio of said body portion; and wherein, during said step of biaxial stretch blow molding said inner bottle, the air within said outer bottle is expelled via said air vent holes formed at said body and bottom portions of said outer bottle.

23. A double-wall bottle consisting only of an outer bottle having a biaxially orientated body portion and a bottom portion, and an inner bottle positioned within said outer bottle, wherein:

a plurality of air vent holes are formed in said body portion and said bottom portion of said outer bottle, and an opening ratio of said air vent holes per unit area is set to be larger in said bottom portion than in said body portion.

24. An apparatus for molding a double-wall bottle, comprising:

a means of forming an outer bottle having body and bottom portions by biaxial stretch blow molding a first preform;

a means of forming air vent holes in said body and bottom portions of said outer bottle in a predetermined pattern for enabling venting through said holes;

a means of setting a second perform and said outer bottle into a first blow cavity mold, said second preform being placed inside of said outer bottle, said second perform having a body portion of an outer diameter smaller than the diameter of an opening of said first preform and having a bottom; and a means of forming an inner bottle within said outer bottle by biaxial stretch blow molding said second preform while expelling the air within said outer bottle through said air vent holes, wherein said first blow cavity mold includes means for venting the expelled air from the air vent holes including the air vent holes formed in the predetermined pattern.

25. An apparatus according to claim 24, comprising:

a first blow molding machine that injection-molds said first preform and forms said outer bottle by biaxial stretch blow molding from said first preform while retaining the heat with which said first preform is injection-molded;

a second blow molding machine that injection-molds said second preform and forms said inner bottle by biaxial stretch blow molding from said second preform while retaining the heat with which said second preform is injection-molded and which is placed within said outer bottle; and a conveyor means that supplies and conveys said outer bottle, ejected from said first blow molding machine, to said second blow molding machine at a determine that matches the timing of the biaxial stretch blow molding of said inner bottle.

26. An apparatus according to claim 25, wherein:

said air vent hole forming means is provided partway along a path along which said outer bottle is supplied and conveyed to said second blow molding machine.

27. An apparatus for molding a double-wall bottle according to claim 24, wherein the means for venting vents air faster from the air vent holes in the bottom portion than the air vent holes in the body portion.

28. An apparatus for molding a double-wall bottle according to claim 24, wherein the means for forming the inner bottle comprises means for expanding the inner bottle substantially instantaneously.

29. An apparatus for molding a double-wall bottle, comprising:

means for forming an outer bottle having body and bottom portions by biaxial stretch blow molding a first preform;

means for forming air vent holes in said body and bottom portions of said outer bottle;

means for setting a second preform and said outer bottle into a first blow cavity mold, said second preform being placed inside of said outer bottle, said second preform having a body portion of an outer diameter smaller than the diameter of an opening of said first preform and having a bottom;

means for forming an inner bottle within said outer bottle by biaxial stretch blow molding said second preform while expelling the air within said outer bottle through said air vent holes;

wherein said apparatus further comprising:

a first blow molding machine for injection-molding said first preform and forming said outer bottle by biaxial stretch blow molding from said first preform while retaining the heat with which said first preform is injection-molded;

a second blow molding machine for injection-molding said second preform and forming said inner bottle by biaxial stretch blow molding from said second preform while retaining the heat with which said second preform is injection-molded and which is placed within said outer bottle;

a conveyor means for supplying and conveying said outer bottle, ejected from said first blow molding machine, to said second blow molding machine at a timing that matches a timing of the biaxial stretch blow molding of said inner bottle; and wherein a number N (where N≦1) of said second blow molding machines and a number M (where M>N) of said first blow molding machines are connected by said conveyor means.

* * * * *